United States Patent
Kagose et al.

(10) Patent No.: US 9,186,911 B2
(45) Date of Patent: Nov. 17, 2015

(54) INK JET RECORDING METHOD, PHOTOCURABLE INK JET INK COMPOSITION, AND INK JET RECORDING DEVICE

(71) Applicant: Seiko Epson Corporation, Tokyo (JP)

(72) Inventors: Taketoshi Kagose, Kurobe (JP); Shinichi Kato, Matsumoto (JP); Tomohito Nakano, Shiojiri (JP); Hiroki Nakane, Matsumoto (JP); Chigusa Sato, Shiojiri (JP); Kenji Kitada, Matsumoto (JP); Yoshinobu Sato, Osaka (JP); Hiroshi Sawada, Ikoma-gun (JP); Hirotoshi Koyano, Kobe (JP)

(73) Assignee: SEIKO EPSON CORPORATION, Tokyo (JP)

( * ) Notice: Subject to any disclaimer, the term of this patent is extended or adjusted under 35 U.S.C. 154(b) by 248 days.

(21) Appl. No.: 13/851,467

(22) Filed: Mar. 27, 2013

(65) Prior Publication Data
US 2013/0258017 A1 Oct. 3, 2013

(30) Foreign Application Priority Data
Mar. 28, 2012 (JP) .................. 2012-074183

(51) Int. Cl.
| | |
|---|---|
| *B41J 2/01* | (2006.01) |
| *B41J 11/00* | (2006.01) |
| *C09D 11/30* | (2014.01) |
| *C09D 11/101* | (2014.01) |
| *C09D 11/322* | (2014.01) |

(Continued)

(52) U.S. Cl.
CPC .......... *B41J 11/0015* (2013.01); *B41M 5/0023* (2013.01); *B41M 7/0081* (2013.01); *C09D 11/101* (2013.01); *C09D 11/30* (2013.01); *C09D 11/322* (2013.01); *B41M 7/009* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ............. 347/100, 102, 101, 95, 96; 106/31.6, 106/31.27, 31.13; 523/160, 161
See application file for complete search history.

(56) References Cited

U.S. PATENT DOCUMENTS

| | | | |
|---|---|---|---|
| 2004/0075726 A1* | 4/2004 | Hirai | .................. 347/102 |
| 2006/0055752 A1 | 3/2006 | Nakajima | |

(Continued)

FOREIGN PATENT DOCUMENTS

| | | |
|---|---|---|
| JP | 2000-117960 A | 4/2000 |
| JP | 2004-209976 A | 7/2004 |

(Continued)

*Primary Examiner* — Manish S Shah
(74) *Attorney, Agent, or Firm* — Nutter McClennen & Fish LLP; John J. Penny, Jr.

(57) ABSTRACT

The ink jet recording method includes discharging liquid droplets of a photocurable ink composition including a solvent, a polymerizable compound, and a photopolymerization initiator from a head to a recording medium to land the liquid droplets, thereby forming an image; evaporating the solvent included in the photocurable ink composition constituting the image; and irradiating the image after the second step with light, wherein when the irradiation is initiated in the third step, the content of the polymerizable compound included in the photocurable ink composition constituting the image after the second step is from 20 to 90% by mass, based on the total mass of the ink composition.

22 Claims, 3 Drawing Sheets

| | |
|---|---|
| HYDROPHOBIC MOIETY ～◯ HYDROPHILIC MOIETY | AMPHIPHILIC URETHANE (METH) ACRYLATE OF THE PRESENT INVENTION |
| ～ | COMPOUND HAVING A RADICAL POLYMERIZABLE GROUP |
| ◯ | PHOTORADICAL POLYMERIZATIONINITIATOR |

(51) Int. Cl.
  *B41M 7/00*   (2006.01)
  *B41M 5/00*   (2006.01)

(56) References Cited

U.S. PATENT DOCUMENTS

2008/0041273 A1* 2/2008 Baumgart et al. ....... 106/287.13
2012/0225968 A1* 9/2012 Nakano et al. .................. 522/16
2012/0225969 A1* 9/2012 Miyabayashi et al. .......... 522/53

FOREIGN PATENT DOCUMENTS

| JP | 2007-245630 A | 9/2007 |
| JP | 2010-042542 A | 2/2010 |
| JP | 2010-167677 A | 8/2010 |

\* cited by examiner

↓ SUB-SCANNING DIRECTION

↔ MAIN SCANNING DIRECTION

INK JET RECORDING METHOD, PHOTOCURABLE INK JET INK COMPOSITION, AND INK JET RECORDING DEVICE

BACKGROUND

1. Technical Field

The present invention relates to an ink jet recording method, a photocurable ink jet ink composition used in the recording method, and an ink jet recording device using the method.

2. Related Art

A variety of recording systems have been used as an image recording method for forming an image on a recording medium such as paper based on image data signals. Among these, an ink jet system uses an inexpensive apparatus to form an image directly on a recording medium by discharging an ink only on a required image area, thus achieving efficient use of an ink and low running costs. Further, the ink jet system is an excellent recording system due to less generation of noise.

In order to form printing having high water resistance, solvent resistance, scratch resistance, and the like on the surface of a recording medium, a recording method in an ink jet system using a photocurable ink composition that is curable by irradiation of ultraviolet rays has recently been used.

For example, JP-A-2000-117960 discloses an ink jet recording method, in which a static contact angle γw satisfies γw≤60 with respect to pure water on a printing surface, and printing is performed using an ink and a printed material, satisfying the condition of VR≤VL×0.5, when the ink volume per unit area, which is applied during one-color solid printing, and the capacity of the ink which can be absorbed by the printing surface are defined as VL (pl/cm$^2$) and VR (pl/cm$^2$), respectively.

Furthermore, JP-A-2004-209976 discloses an ink jet recording method, in which an ink is landed on a substrate and then ultraviolet rays are irradiated within a contact time such that the liquid transition amount of the ink by a Bristow method with respect to the substrate becomes less than 20 ml/mm$^2$.

In addition JP-A-2007-245630 discloses an ink jet recording method, in which an ink is provided on a non-ink-absorptive recording medium, ultraviolet rays are irradiated whenever the ink is provided, thereby curing the ink to perform the recording, wherein the amount of the ink per once when the ink is dividedly provided plural times is set such that the amount of the moisture contained in the ink per unit area of the recording medium is 0.12 mg/cm$^2$ or less.

However, the ink jet recording methods disclosed in JP-A-2000-117960, JP-A-2004-209976, and JP-A-2007-245630 all have a problem that at least any one of curability, fillability, adhesiveness, and discharge stability is deteriorated.

SUMMARY

Therefore, it is an object of the invention to provide an ink jet recording method, which is excellent in curability, fillability, adhesiveness, and discharge stability.

Furthermore, it is another object of the invention to provide a photocurable ink jet ink composition used in the recording method and an ink jet recording device using the recording method.

The present inventors have made extensive investigations to solve the problems, and as a result, they have found that the above-described problems are solved by an ink jet recording method including discharging liquid droplets of a predetermined photocurable ink composition onto a recording medium to land the liquid droplets, thereby forming an image, evaporating the solvent included in the photocurable ink composition constituting the image, and irradiating an image after the second step with light, in which when the irradiation is initiated, the content of the polymerizable compound included in the photocurable ink composition constituting the image after the second step is a predetermined value, thereby completing the invention.

[1] According to a first aspect of the invention, there is provided an ink jet recording method including discharging liquid droplets of a photocurable ink composition including a solvent, a polymerizable compound, and a photopolymerization initiator from a head to a recording medium to land the liquid droplets, thereby forming an image; evaporating the solvent included in the photocurable ink composition constituting the image, and irradiating the image after the second step with light, wherein when the irradiation is initiated in the third step, the content of the polymerizable compound included in the photocurable ink composition constituting the image after the second step is from 20 to 90% by mass, based on the total mass of the ink composition.

[2] In the ink jet recording method according to aspect [1], the recording medium may non-ink-absorptive or low-ink-absorptive.

[3] In the ink jet recording method according to aspect [1] or [2], the polymerizable compound may be included in the photocurable ink composition in the dispersion state.

[4] In the ink jet recording method according to any one of the aspects [1] to [3], the polymerizable compound may be a urethane (meth)acrylate.

[5] In the ink jet recording method according to aspect [4], the polymerizable compound may be a urethane (meth)acrylate having a hydrophobic structure represented by the following general formula (1), and a hydrophilic structure represented by the following general formula (2) in the molecule thereof:

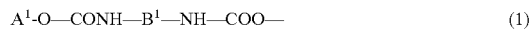

(wherein A$^1$ represents a residue of a hydroxyl group-containing (meth)acrylate, B$^1$ represents a residue of a diisocyanate, and D$^1$ represents a residue of a polyoxyalkylene glycol monoalkyl ether).

[6] In the ink jet recording method according to aspect [5], the urethane (meth)acrylate may have a weight average molecular weight of 1,000 to 10,000 and is at least either of a compound represented by the following general formula (3) and a crosslinked urethane (meth)acrylate having a structural unit including the compound:

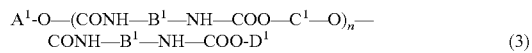

(wherein n represents an integer of 1 to 30, A$^1$ represents a residue of a hydroxyl group-containing (meth)acrylate, B$^1$ represents a residue of a diisocyanate, C$^1$ represents a residue of a diol of a noncyclic hydrocarbon or a cyclic hydrocarbon, and D$^1$ represents a residue of a polyoxyalkylene glycol monoalkyl ether).

[7] In the ink jet recording method according to any one of aspects [1] to [6], the content of the polymerizable compound included in the photocurable ink composition constituting the image after the second step may be from 30 to 90% by mass based on the total mass of the ink composition.

[8] In the ink jet recording method any one of aspects [1] to [7], main scanning for discharging the photocurable ink composition from the head onto the recording medium and sub-scanning for moving the recording medium and the head in the minor direction relatively crossing the major direction may be carried out alternatively to perform recording, and a light source for carrying out the irradiation on the downstream side in the minor direction with respect to the head may be provided; and the irradiation is carried out next to the main scanning in which the photocurable ink composition may be attached to the recording medium.

[9] According to another aspect of the invention, there is provided a photocurable ink jet ink composition used in the ink jet recording method according to any one of aspects [1] to [8].

[10] According to still another aspect of the invention, there is provided an ink jet recording device using the ink jet recording method according to any one of aspects [1] to [8].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
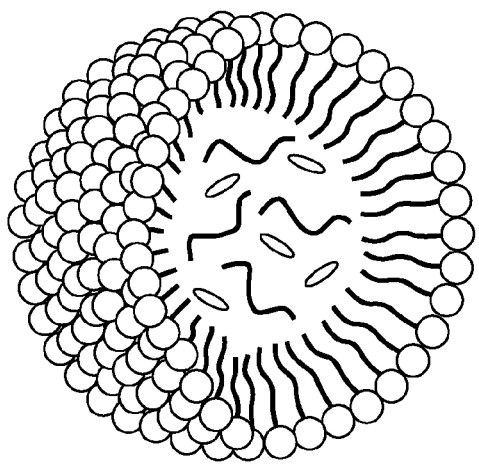
FIG. 1 is a schematic diagram macroscopically illustrating the photocurable aqueous emulsion in the invention.

Hereinbelow, the embodiments for carrying out the invention will be described in detail. Further, the invention is not limited to the following embodiments, and can be carried out with various modifications added within a range of its subject matter.

In the present specification, "curing" denotes that when an ink including a polymerizable compound is irradiated with light, the polymerizable compound is polymerized and the ink is solidified. The "curability" denotes a property of curing in response to light, is also referred to photopolymerizability. The "fillability" is also referred to as repletion, and denotes a property of an under layer recording medium being not seen from the side on which a cured product (image) is formed. The "adhesiveness" denotes a property of a coated film (of an ink) being not readily peeled from a foundation. The "discharge stability" denotes a property of there being no clogging of nozzles, with the liquid droplets of the ink being always stably discharged from the nozzles. The "storage stability" refers to a property of a viscosity of an ink before and after storage thereof being not readily changed, when the ink is stored.

In the present specification, the "solid image" means an image, in which when dots are recorded on all the pixels that are minimum recording unit regions defined in a recording resolution, the recording region of the recording medium is covered with the ink and the recording surface is not seen, and the "solid printing" means the printing of the image. The "recorded product" denotes that an ink is recorded on a recording medium to form a cured product. Further, the cured product in the present specification means a cured material including a cured film and a coated film.

In the present specification, the "solvent" means a solvent that can be evaporated by the second step as described later.

In the present specification, "(meth)acrylate" means at least either of an acrylate and a methacrylate corresponding to the acrylate, "(meth)acryl" means at least either of an acryl and a methacryl corresponding to the acryl, and "(meth)acryl" means at least either of an acryloyl and a methacryloyl corresponding to the acryloyl.

Ink Jet Recording Method

One embodiment of the invention relates to an ink jet recording method. The ink jet recording method includes at least 3 steps. At first, the liquid droplets of a photocurable ink composition (hereinafter also referred to an "ink" or an "ink composition") including a solvent, a polymerizable compound, and a photopolymerization initiator are discharged from a head to a recording medium to land the liquid droplets, thereby forming an image. At second, the solvent included in the photocurable ink composition constituting the image is evaporated. At third, the image after the second step is irradiated with light, wherein when the irradiation is initiated in the third step, the content of the polymerizable compound included in the photocurable ink composition constituting the image after the second step is from 20 to 90% by mass, based on the total mass (100% by mass) of the ink composition. Thus, a cured film is formed by the photocurable ink composition cured on the recording medium. Hereinafter, the respective stages as above will be described in detail.

First Step

This step can be said discharging a predetermined photocurable ink composition. In this first step, the viscosity of the ink during the discharge is preferably set to 25 mPa·s or less, and more preferably to 5 to 20 mPa·s. If the viscosity of the ink is as described above when the temperature of the ink is set to room temperature or when the ink is not under heating, the discharge may be performed while the temperature is set to room temperature or the ink is not heated. On the other hand, by heating the ink to a predetermined temperature, the discharge may be performed after the viscosity is set to a preferred value. Thus, better discharge stability is accomplished.

As the discharge method, heretofore known methods may be used, and in the case of using a method of discharging liquid droplets using the vibration of a piezoelectric element among them (a recording method using a head that forms ink droplets by mechanical deformation of an electrostrictive element), excellent recording can be performed. The weight of the liquid droplet of the ink during the discharge is not particularly limited, but is preferably from 1 to 20 ng, and the resolution of the ink is not particularly limited, but is preferably from 720 dpi×720 dpi to 1440 dpi×1440 dpi. A weight of the liquid droplet and the recording resolution falling within the above ranges make it possible to obtain a high-precision recording image.

Furthermore, the film thickness at the time of coating (printing) the ink composition on the recording medium is preferably from 1 to 10 μm since good curability is obtained. Further, the coated film with the ink, that is, an image is formed, by making the liquid droplets of the ink discharged from the head of the ink jet recording device land (be attached) on the recording surface of the recording medium.

Here, as a recording medium, there exist recording media having various absorption performance, ranging from a non-absorptive recording medium into which an ink hardly permeates into an absorptive recording medium into which an ink easily permeate. Among these, as the recording medium used in the first step, a non-ink-absorptive or low-ink-absorptive recording medium is preferred. Thus, the strike through of the ink is inhibited, and thus, a recorded image having high chromogenicity is obtained.

Hereinbelow, the recording medium will be described in detail.

In this specification, the "non-ink-absorptive or low-ink-absorptive recording medium" refers to a recording medium that includes no ink receiving layer (accepting layer) or includes a receiving layer that has only a thickness not to allow the recording exhibit the functions of the receiving layer. More quantitatively, the "non-ink-absorptive or low-ink-absorptive recording medium" refers to a recording medium having a recording surface that absorbs 10 mL/m² or less of water according to a Bristow method from the onset of the contact up to 30 msec$^{1/2}$.

The Bristow method is described in "Standard No. 51 of Method for testing the liquid absorbability of paper and board—a Bristow's method" in "JAPAN TAPPI Paper Pulp Test Methods, version 2000". In short, the Bristow method is a method for measuring the surface wetting of the recording medium with a liquid in a short period of time in milliseconds, and subsequently, the penetration behavior of the liquid into the recording medium, in which the liquid is transferred dynamically from a headbox to a test piece on a rotating wheel and an absorption coefficient Ka [unit: mL/m² (msec$^{1/2}$)] is determined from the absorption time and the transfer amount.

Examples of the ink non-absorptive recording medium include, but are not limited to, a plastic film which is not subjected to a surface treatment for ink jet recording, that is to say, has no ink-receiving layer, and a substrate such as a plastic and paper, which is coated with a plastic and with which a plastic film is contacted. Herein, examples of the plastic include, but are not limited to, polyvinyl chloride (PVC), polyethylene terephthalate (PET), polycarbonate, polystyrene, polyurethane, polyethylene, and polypropylene.

Examples of the ink low-absorptive recording medium include, but are not limited to, coated paper, and recording sheets (printing paper) such as fine coated paper, art paper, coat paper, mat paper, cast paper.

Coated paper is paper having a surface coated with a coating material in order to enhance the aesthetic quality and smoothness. The coating material can be prepared by mixing a pigment such as talc, pyrophyllite, clay (kaolin), titanium oxide, magnesium carbonate, and calcium carbonate, with an adhesive such as starch and polyvinyl alcohol. The coating material is applied by using a machine called a coater during production of the paper. The coater can be of an on-machine type in which the coater is directly connected to a paper machine to perform paper-making and coating in one stage or of an off-machine type in which paper-making is conducted separately.

Fine coated paper refers to recording paper in which the amount of the coating material applied is 12 g/m² or less. The art paper refers to recording paper produced by applying about 40 g/m² of a coating material to high-quality paper (high-grade recording paper). The coated paper refers to recording paper produced by applying about 20 g/m² to 40 g/m² of a coating material. The cast paper refers to paper produced by pressuring surfaces of art paper or coated paper by using a cast drum to be finished so that the metal gloss and the smoothness is made superior.

Furthermore, a predetermined photocurable ink composition will be described later.

Second Step

Next, the solvent included in the photocurable ink composition constituting the image formed in the first step is evaporated. For the preparation of the photocurable ink composition, by increasing the content of the solvent in advance, not decreasing the content of the solvent, and then discharging and landing, and then evaporating a determined amount of the solvent makes the ink excellent in the discharge stability.

For the extent of second step, the content of the polymerizable compound included in the ink composition is from 20 to 90% by mass, based on the total mass (100% by mass) of the ink composition. If the content is 20% by mass or more, the curability and the adhesiveness of the ink-coated film are made excellent. On the other hand, if the content is 90% by mass or less, the ink becomes excellent in the fillability and the discharge stability. Further, the content is preferably from 30 to 90% by mass, particularly since the ink coating film becomes superior in the adhesiveness.

In addition, the range of numerical values expressed as the extent of second step may be any one that is accomplished at the time of initiation of light irradiation in the third step.

Furthermore, the extent of second step, that is, the content of the polymerizable compound after the evaporation can be measured by the method as described later.

The method for evaporating the solvent is not limited to the methods below, but examples thereof include heating and air blowing, and among these, heating is preferred. The heating method is not limited to the methods below, but examples thereof include units using a heater included in an ink jet recording device, a hot-air mechanism included in an ink jet recording device, and a drying mechanism such as a thermostat vessel connected to an ink jet recording device, and the like. Further, these units may be used singly or in combination of two or more kinds thereof.

The temperature of the recording medium on which the ink-coated film is present during the second step varies depending on the recording medium, but is preferably from 35 to 70° C., and more preferably from 40 to 60° C. A temperature falling within the above range makes it possible to shorten the evaporation time of the solvent and carry out the recording on the materials of the recording media that are deformable with heat. In addition, the treatment time during the second step, such as heating, is not particularly limited, but is, for example, from about 5 to 60 seconds.

Third Step

The third step can be referred to curing for the photocurable ink composition. First, when it is initiated to irradiate the image after the second step with light, the content of the polymerizable compound included in the photocurable ink composition constituting the image after the second step falls within the above range. Further, the present stage involves curing by irradiating the image after the second step with light (radiation).

Specifically, the polymerization reaction of the polymerizable compound is initiated by light irradiation. Further, the photopolymerization initiator included in the ink composition is degraded by light irradiation to generate initiation species such as radicals, acids, and bases, and thus, the polymerization reaction of the polymerizable compound is promoted according to the functions of the initiation species. At this time, when a sensitizing colorant is present in combination with a photopolymerization initiator in the ink composition, the sensitizing colorant in the system absorbs actinic radiation and is in the excitation state, and when it is in contact with a photopolymerization initiator, the degradation of the photopolymerization initiator is promoted, and thus, a curing reaction can be accomplished with a higher sensitivity.

As for the light source, a mercury lamp, a gas/solid laser, and the like are principally utilized, and as the light source used for curing the photocurable ink jet ink composition, a mercury lamp and a metal halide lamp are widely known. On the contrary, there is currently a strong need for being mercury-free in view of environmental protection, and replacement by a GaN-based semiconductor ultraviolet-emitting device is industrially and environmentally very useful. In addition, an ultraviolet light-emitting diode (UV-LED) and an ultraviolet laser diode (UV-LD) are compact, long-lived, highly efficient, and inexpensive, and are promising as a light source for a photocurable ink jet. Among these, an UV-LED is preferred.

The light-emitting peak wavelength at the time of irradiation above is preferably in the range of 360 to 420 nm, and more preferably in the range of 380 to 400 nm. The light-emitting peak wavelength falling within the above range is suitable since UV-LED is easily available and inexpensive.

Furthermore, one or plural light-emitting peak wavelengths may be present in the above preferred wavelength ranges. In the case of plural light-emitting peak wavelengths are present, the irradiation energy amount of the entire ultraviolet rays having the light-emitting peak wavelength are set to the irradiation energy.

The peak intensity (irradiation peak intensity) of the ultraviolet rays irradiated above is preferably from 100 to 4,000 mW/cm$^2$, more preferably from 500 to 2,000 mW/cm$^2$, and even more preferably from 800 to 2,000 mW/cm$^2$. A case where the irradiation peak intensity falls within the above range makes the curability superior, and can lower the cost of an irradiator and make the discharge stability superior in terms of inhibition of an effect of heat generation or light leakage from the light source on the head.

Furthermore, for the irradiation peak intensity in the present specification, a value measured using an ultraviolet intensitometer UM-10 and a Receptor Head UM-400 (both manufactured by Konica Minolta Sensing, Inc.) may be used. However, this is not intended to limit the method for measuring an irradiation peak intensity, and commercially known measurement methods may be used.

Furthermore, the irradiation energy at the time of irradiation above is preferably from 100 to 500 mJ/cm$^2$, and more preferably from 200 to 500 mJ/cm$^2$. The irradiation energy falling within the above range make the curability superior and can lower the cost of the irradiation section required needed for the irradiation.

In addition, the irradiation energy in the present specification is calculated by multiplying a time between the initiation of the irradiation and the end of the irradiation by the irradiation peak intensity. Sufficient curing may be carried out such that the recorded product may be used by one time of irradiation, or sufficient curing may be carried out such that the a recorded product can be used by plural times of irradiation. In addition, in the latter case, the content of the polymerizable compound included in the ink composition when the primary irradiation is carried out is referred to "the content of the polymerizable compound" as described above.

If the irradiation peak intensity, the irradiation energy, and the light-emitting peak wavelength as described above are in the preferred ranges, low energy is taken due to the composition of the photocurable ink composition as described later and the curing can be carried out at a higher speed. Further, the irradiation time can be shortened by the composition of the ink composition, and in this case, the printing speed increases. On the other hand, the irradiation peak intensity can be decreased by the composition of the ink composition, and in this case, a smaller device or lower cost can be accomplished.

Other Stages

The ink jet recording method of the present embodiment may include other stages, in addition to the first step through the third step. For example, the heating may be carried out after the third step. The heating is intended to dry the obtained cured film sufficiently. The heating method or condition for the heating is the same as described in the second step.

As described above, according to the present embodiment, an ink jet recording method which is excellent in curability, fillability, adhesiveness, and discharge stability can be provided.

Ink Jet Recording Device

One embodiment of the invention relates to an ink jet recording device, that is, a printer. The recording device employs the ink jet recording method of the embodiment.

Examples of the kind of the printer include a line printer and a serial printer, and in the present embodiment, any of the printers may be used. The printing systems of the printer and the serial printer are different from each other. In short, the line printer performs printing in one pass (single-pass), with a head being (substantially) not moved but fixed, with a line head having a length corresponding to the width of the recording medium (recording medium width). On the other hand, the serial printer performs printing usually in two or more passes (multi-pass), with a head being reciprocally moved (shuttle movement) in the direction (hereinafter also referred to as the "main scanning direction") intersecting the transport direction (hereinafter also referred to as the "sub-scanning direction") of the recording medium.

More specifically, for the line printer, an image is formed by scanning the recording medium in a predetermined direction (sub-scanning direction). Thus, the line printer has a remarkably higher printing speed than the serial printer. On the other hand, the serial printer has a small amount of the ink discharged per pass, as compared with the line printer and allows a multi-pass printing with printing twice or more (number of main scanning), and therefore, an image can be formed by overlaying the ink separately twice or more, thereby providing the image with superior image quality.

Furthermore, the "pass" means the number of irradiation of the ink-coated film with light from a light source (light irradiation device) mounted on a head, while moving the head with respect to the recorded product.

Preferred embodiments, where such an ink jet recording device is employed in the ink jet recording method of the embodiment, will be described. In the first embodiment, a serial printer is employed. The recording is carried out by alternatively performing main scanning, in which a photocurable ink composition from a head is discharged to a recording medium (first step), and sub-scanning, in which a recording medium and a head are moved in the sub-scanning direction relatively intersecting the main scanning direction. The second step by heating in the second step is carried out at least one time of during the main scanning and from the end of the main scanning to the irradiation. Examples of the heating unit include, but are not limited to, a heater installed above a head and a platen heater. The light source for light irradiation carried out in the third step is at least any one provided above a carriage and outside a carriage, on the downstream in the sub-scanning direction with respect to the head. Further, the light irradiation is carried out after the main scanning, in which an ink composition is attached to (lands on) a recording medium.

For the second embodiment, a serial printer is employed. As described above, the recording is carried out by alternatively performing the main scanning and the sub-scanning, that are included in the first step. The second step by heating in the second step is carried out at any timing from the discharge of an ink (the first step) to the initiation of the light irradiation (the third step). The light source for light irradiation carried out in the third step is provided beside the head above a carriage, and the irradiation is carried out in the same main scanning as for the discharge of the ink (the first step). The heating unit is the same as in the first embodiment, and thus, the description thereof is not repeated.

For the third embodiment, a line printer is employed. The second step by heating in the second step is carried out at any timing of from the discharge of an ink (the first step) to the initiation of the light irradiation (the third step). The heating unit is the same as in the first embodiment, and thus, the description thereof is not repeated here.

In any of the first embodiment through the third embodiment, the recording device (serial printer) can be made at low cost and with a small size, and has superior curability in that the light irradiation can be carried out after the ink is attached and sufficient heating and drying are carried out, and therefore, the first embodiment is preferred. Among the types of the first embodiment, an embodiment, in which the light source for the light irradiation carried out in the third step is provided above a carriage, is more preferred since the recording device can be made at lower cost and with a smaller size.

Figure 3:
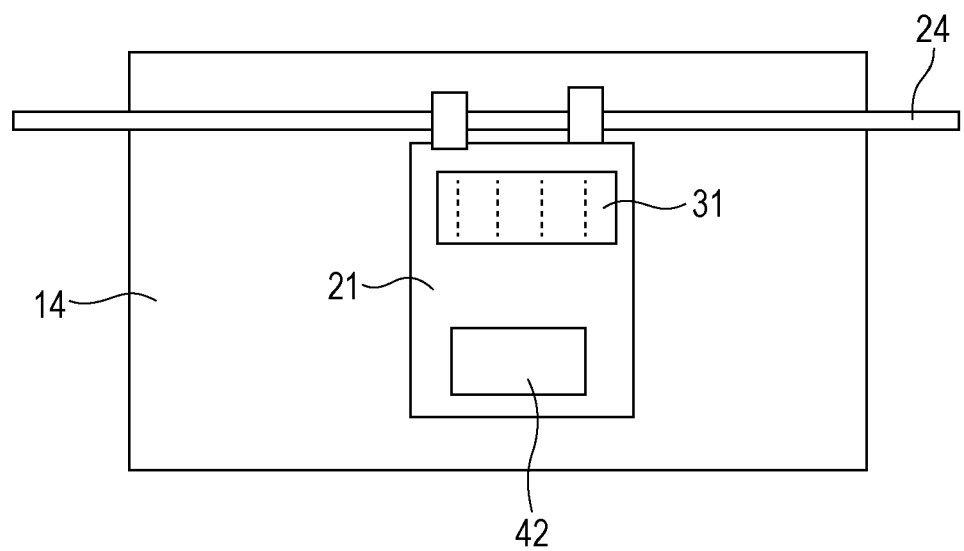
FIG. 3 is a conceptual diagram illustrating one example of the periphery of a head and a platen in an ink jet recording device which is one example of one embodiment of the invention.

FIG. 3 is a conceptual diagram illustrating one example of the periphery of a head and a platen in an ink jet recording device which is one example of the present embodiment. The ink jet recording device shown in FIG. 3 include a light source on the downstream in the sub-scanning direction with respect to the head on the cartridge in the first embodiment, and performs the recording in an embodiment, in which the light irradiation is carried out in the main scanning after the main scanning for attaching the ink on the recording medium.

A carriage 21 includes a head 31 and an irradiation section 42 which is a light source, is derived by a carriage motor (not shown in the drawings) with a carriage shaft 24 as a shaft, and performs main scanning, moving in the main scanning direction. The head 31 includes four nozzle columns. The platen 14 includes a platen heater (not shown in the drawings). The ink is discharged onto the recording medium (not shown in the drawings) present on the platen 14 from the head 31 by the main scanning of the head 31, in the position facing the head 31 on the platen 14, and is attached on the recording medium. The sub-scanning and the main scanning are alternatively carried out, in which the relative positions of the sub-scanning directions of the recording medium and the head 31 are changed. The light irradiation is carried out by a irradiation section 42 toward the recording medium attached with the ink, which is sub-scanned on the downstream side in the sub-scanning direction with respect to the position facing the head 31. Such a recording device can be configured, for example, in the same manner as in FIG. 2 of JP-A-2010-167677, except that the irradiation section 42 is provided on the downstream side in the sub-scanning direction with respect to the head 31 and the platen includes the platen heater.

Here, measurement of the degree to which the solvent is evaporated in the second step, that is, measurement of the content of the polymerizable compound after the evaporation can be carried out, by a more preferred method in the first embodiment. To be specific, solid printing is first carried out on a recording surface of the recording medium with a light source being turned off, using a serial printer having a platen heater (the first step). At this time, the mass of the recording medium before the printing (hereinafter referred to as "mass I"), the mass when the recording medium is taken out from the printer immediately after the solid printing under the condition where the platen is not heated (hereinafter referred to as "mass II"), and the mass when the recording medium is taken out from the printer after the platen is printed at a predetermined temperature and heated for a determined period of time (hereinafter referred to as "mass III") are measured, respectively. Further, the content of the polymerizable compound after the evaporation under a predetermined heating temperature and a predetermined heating time is calculated by fitting the value of each of the masses measured above to the following numerical formula (I).

$$\{(\text{Mass II} - \text{Mass I}) \times \text{Content of the polymerizable compound in the ink composition before the printing}\}/(\text{Mass III} - \text{Mass I}) \quad (I)$$

Furthermore, the measurement and calculation methods were employed in Examples as described below.

Moreover, in the case of evaluating the recorded product, solid printing is performed with a platen at a predetermined temperature in the state where the light irradiation is still not carried out using the serial printer including the platen heater, and the carriage is stopped at a cap position at a predetermined time. Further, after the passage of a predetermined period of time, the recording medium is transported to the position at which the solid image can face the light source, the carriage is empty-scanned, and the solid image is irradiated.

Furthermore, in the case of practical printing, a time taken when the image is printed in the region facing the head of the recording medium, and then the printed image is moved to a position facing the light source along the sub-scanning and irradiated may be appropriately adjusted to a predetermined time by appropriately setting the distance between the head and the light source, the pause time between the passes, and the like.

Photocurable Ink Jet Ink Composition

One embodiment of the invention relates to a photocurable ink jet ink composition (hereinafter also referred to as a "photocurable ink composition"). The photocurable ink composition is used in the ink jet recording method of the embodiment, and includes at least a solvent, a polymerizable compound, and a photopolymerization initiator. Thus, the liquid properties of the photocurable ink composition are not in a so-called solvent-free system, but a so-called solvent system, specifically a water system or solvents.

Hereinafter, the additives (components) that are included or may be included in the photocurable ink composition of the present embodiment will be described.

1. Polymerizable Compound

The polymerizable compound included in the ink composition can be polymerized during the light irradiation by the action of a photopolymerization initiator as described later, to cure the printed ink. The polymerizable compound is preferably included in the dispersion state (as a dispersion) in the ink composition since the curability or discharge stability is made better, and more preferably in the form of an emulsion in the ink composition. In the case where the polymerizable compound is included in the dispersion state in the ink composition, the polymerizable compound may be either a compound having a function of a dispersant or a compound dispersed by a dispersant or by self-dispersion. In the case where the polymerizable compound is included in the form of an emulsion in the ink composition, the polymerizable compound may be a compound having emulsifying capability or a compound in the form of an emulsion included in the ink composition, together with a compound having emulsifying capability. That is, in the present specification, the polymerizable compound in the dispersion state is any of the compounds constituting a dispersion, and the polymerizable compound in the form of an emulsion may be at least any one of a compound having a polymerizable group in the products included in the emulsion particles and an amphiphilic urethane acrylate having a polymerizable group, constituting the periphery of the emulsion. The content of the polymerizable compound is preferably from 1% by mass to less than 60% by mass, preferably from 5 to 50% by mass, still more preferably from 5 to 20% by mass, and even still more preferably from 5 to 15% by mass, based on the total mass (100% by mass) of the ink composition since the curability and the discharge stability is made excellent. A smaller content provides superior discharge stability, but the discharge stability depends on the type of the polymerizable compound, or the like. Therefore, the upper limit of the content is not limited to the above ranges, and in terms of superior curability, a larger content is preferred.

As the polymerizable compound, compounds having a variety of polymerizable groups, such as monofunctional, bifunctional and trifunctional or higher polyfunctional groups, may be used. Specific examples thereof include unsaturated carboxylic acids such as (meth)acrylic acid, itaconic acid, crotonic acid, isocrotonic acid and maleic acid, salts or esters thereof, urethane, amides and anhydrides thereof, acrylonitrile, styrene, various unsaturated polyesters, unsaturated polyethers, unsaturated polyamides, and unsaturated urethanes, N-vinyl compounds, urethane (meth)acrylate, epoxy (meth)acrylate, oxetane (meth)acrylate, and polyester (meth)acrylate.

Among those, the urethane (meth)acrylate is preferred due to superior fillability and adhesiveness. Examples of the urethane (meth)acrylate include, but are not limited to, an aliphatic urethane (meth)acrylate and an aromatic urethane (meth)acrylate.

1-1. Urethane (Meth)Acrylate Having Structures Represented by General Formulae (1) and (2)

Among those above, a urethane (meth)acrylate having a hydrophobic structure represented by the following general formula (1) and a hydrophilic structure represented by the following general formula (2) in the molecule thereof is preferred since it has excellent self-emulsifying capability and emulsifiability.

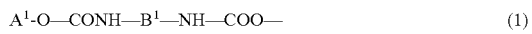

$$A^1\text{-O-CONH-}B^1\text{-NH-COO-} \quad (1)$$

$$\text{-}D^1 \quad (2)$$

In the formula (1), $A^1$ represents a residue of a hydroxyl group-containing (meth)acrylate and $B^1$ represents a residue of a diisocyanate. Further, $D^1$ in the formula (2) represents a residue of a polyoxyalkylene glycol monoalkyl ether.

Hereinafter, the preferred urethane (meth)acrylates will be described in detail.

The residue above means, in the structure of the starting material of the urethane (meth)acrylates having the structures represented by the general formulae (1) and (2), the moiety not including the functional group forming the urethane bond; specifically, the residue means the moiety (represented by $A^1$) not including the hydroxyl group in the case of the hydroxyl group-containing (meth)acrylate, the moiety ($B^1$) not including the isocyanate group in the case of diisocyanate, and the moiety ($D^1$) not including the hydroxyl group in the case of the polyoxyalkylene glycol monoalkyl ether.

The weight average molecular weight of the urethane (meth)acrylates having the structures represented by the general formulae (1) and (2) can be derived by measuring the molecular weight distribution on the basis of gel permeation chromatography (GPC). The weight average molecular weight in the present specification means the weight average molecular weight determined relative to polystyrene standards, and is measured using a GPC (HLC-8220 [trade name], manufactured by Tosoh Corporation), in which serially-connected three columns TSK-gel Super HZM-M (exclusion limit molecular weight: $4\times10^6$, molecular weight fraction range: 266 to $4\times10^6$, number of theoretical stages: 16,000 stages/column, packing material: styrene-based copolymer, packing particle size: 3 μm).

The weight average molecular weight of the urethane (meth)acrylates having the structures represented by the general formulae (1) and (2) is from 1,000 to 10,000, and preferably from 2,000 to 8,000. A weight average molecular weight falling within the above range provides a tendency of forming micelles with the urethane (meth)acrylate and makes self-emulsifiability excellent, and further, there is obtained an advantageous effect such that hydrophobic substances tend to be included within the micelles. This is probably because the adoption of the urethane (meth)acrylates having the structures represented by the general formulae (1) and (2) provides a satisfactory balance between hydrophilicity and hydrophobicity.

1-1-1. Hydroxyl Group-Containing (Meth)Acrylate

The hydroxyl group-containing (meth)acrylate is a compound which gives the structure of $A^1$ in the general formula (1). The hydroxyl group-containing (meth)acrylate is used for the purpose of introducing a polymerizable group into the general formula (1). Specifically, the hydroxyl group-containing (meth)acrylate is a compound having one or more (meth)acryloyl groups and one hydroxyl group, and the urethanation reaction of the hydroxyl group with one isocyanate group in the diisocyanate introduces a (meth)acryloyl group(s) to one terminal of the main chain of the urethane (meth)acrylate. The introduction of at least one (meth)acryloyl group enables photopolymerization (photocuring), and the introduction of two or more (meth)acryloyl groups increases the photopolymerization rate and provides an advantageous effect to increase the hardness of the cured product.

The monofunctional monohydroxymono(meth)acrylate is not particularly limited, but examples thereof include 2-hydroxyethyl (meth)acrylate, 2-hydroxypropyl (meth)acrylate, polyethylene glycol mono(meth)acrylate, polypropylene glycol mono(meth)acrylate, and polycaprolactonemono(meth)acrylate.

The bifunctional monohydroxydi(meth)acrylate is not particularly limited, but examples thereof include glycerol di(meth)acrylate.

The trifunctional or higher functional monohydroxypoly(meth)acrylate is not particularly limited, but examples thereof include pentaerythritol tri(meth)acrylate and dipentaerythritol penta(meth)acrylate.

Among these, since an emulsion having a low viscosity is obtained, polypropylene glycol mono(meth)acrylate is preferred, and polypropylene glycol monoacrylate is more preferred. On the other hand, particularly since an emulsion having excellent curability is obtained, at least either of pentaerythritol tri(meth)acrylate and dipentaerythritol penta(meth)acrylate is preferred as the hydroxyl group-containing (meth)acrylate.

The hydroxyl group-containing (meth)acrylates may be used singly or in combination of two or more kinds thereof.

1-1-2. Diisocyanate

The diisocyanate is a compound which gives the structure of $B^1$ in the general formula (1). The diisocyanate means an organic diisocyanate having two reactive isocyanate groups in one molecule thereof.

The diisocyanate is not particularly limited, but examples thereof include diisocyanates having an alicyclic hydrocarbon skeleton, such as isophorone diisocyanate; diisocyanates having an aliphatic hydrocarbon skeleton, such as hexamethylene diisocyanate; diisocyanates having an aromatic hydrocarbon skeleton, such as xylylene diisocyanate, tolylene diisocyanate and diphenylmethane diisocyanate; and diisocyanates having a hydrogenated aromatic hydrocarbon skeleton, such as hydrogenated xylylene diisocyanate and hydrogenated diphenylmethane diisocyanate.

Among these, diisocyanates are preferably one or more selected from the group consisting of isophorone diisocyanate, hexamethylene diisocyanate, hydrogenated xylylene diisocyanate and hydrogenated diphenylmethane diisocyanate since there is obtained an advantageous effect such that the cured product of the urethane (meth)acrylate hardly undergoes yellowing due to sun light (ultraviolet rays).

The diisocyanates may be used intramolecularly or intermolecularly singly or in combination of two or more kinds thereof.

1-1-3. Polyoxyalkylene Glycol Monoalkyl Ether

The polyoxyalkylene glycol monoalkyl ether is a compound which gives the structure of $D^1$ in the general formula (2). Polyoxyalkylene glycol monoalkyl ether is a compound in which one hydroxyl group of polyoxyalkylene glycol is blocked with an alkyl group, and is represented by the following general formula (4):

$$HO\text{—}(CH_2CH_2O)_m\text{—}R \qquad (4)$$

wherein in the formula (4), R represents an alkyl group and m represents a natural number of 9 to 90.

The urethanation reaction of the hydroxyl group with one isocyanate group in the diisocyanate introduces the hydroxyl group to one terminal of the main chain of the urethane (meth)acrylate. Consequently, the urethane (meth)acrylate has a structure of an amphiphilic substance which has a hydrophilic moiety at one terminal of the linear main chain of the substance, and has a hydrophobic moiety constituted of one or more polymerizable (meth)acryloyl groups and hydrophobic groups at the other terminal of the linear main chain, and thus, becomes particularly excellent in emulsifying capability in water.

Since there is obtained an advantageous effect such that the hydrophilicity can be optionally regulated, the polyoxyalkylene glycol monoalkyl ether preferably includes in the molecule thereof a polyoxyethylene structure.

The polyoxyethylene structure is the repeated structure of the oxyethylene group. The average repetition number of the oxyethylene groups, namely, m in the general formula (4) is determined by regulating the balance between hydrophilicity and hydrophobicity so as to result in satisfactory emulsification in water of the urethane (meth)acrylate of the present embodiment, and is preferably a natural number of 9 to 90, more preferably a natural number of 9 to 60 and still more preferably a natural number of 9 to 30.

The polyoxyalkylene glycol monoalkyl ether is not particularly limited, but examples thereof include polyethylene glycol monoalkyl ethers such as polyethylene glycol monomethoxy ether and polyethylene glycol monoethoxy ether.

It is also possible to use polyoxyalkylene glycol monoalkyl ethers including in the molecules thereof, in addition to the polyoxyethylene structure, other polyoxyalkylene structures. In this case, it is preferable for emulsification that the polyoxyethylene structure be located on the side of the terminal alkyl group. Examples of the polyoxyalkylene structure usable in this case together with the polyoxyethylene structure include the polyoxypropylene structure and the polyoxytetramethylene structure. The repetition number of the oxyalkylene group of the polyoxyalkylene structure used together with the polyoxyethylene structure is appropriately determined in consideration of the balance between hydrophilicity and hydrophobicity of the urethane (meth)acrylate.

The terminal alkyl group of the polyoxyalkylene glycol monoalkyl ether, namely, R in the general formula (4) is preferably a methyl group, an ethyl group, or a propyl group, and more preferably a methyl group because the smaller is the number of carbon atoms of the alkyl group, the more the hydrophobicity is lowered and the superior is the emulsifying capability.

The polyoxyalkylene glycol monoalkyl ethers may be used singly or in combination of two or more kinds thereof.

Furthermore, among the urethane (meth)acrylates having the structures represented by the general formulae (1) and (2) as described above, at least either of a urethane (meth)acrylate having a structure represented by the general formula (3) as described later, and a cross-linked urethane (meth)acrylate (hereinafter also simply referred to as a "cross-linked urethane (meth)acrylate") having the structural units including the urethane (meth)acrylate is more preferred.

Hereinafter, the more preferred urethane (meth)acrylate above will be described in detail.

1-2. Urethane (Meth)Acrylate Represented by General Formula (3)

The ink composition of the present embodiment may include a urethane (meth)acrylate having a structure represented by the following general formula (3) to be superior in self-emulsifying capability and emulsifiability.

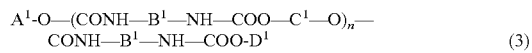

$$A^1\text{-O}\text{—}(CONH\text{—}B^1\text{—}NH\text{—}COO\text{—}C^1\text{—}O)_n\text{—}$$
$$CONH\text{—}B^1\text{—}NH\text{—}COO\text{-}D^1 \qquad (3)$$

wherein in the formula (3), n represents a natural number of 1 to 30, $A^1$ represents a residue of a hydroxyl group-containing (meth)acrylate, $B^1$ represents a residue of a diisocyanate, $C^1$ represents a residue of a diol of a noncyclic hydrocarbon or a cyclic hydrocarbon, and $D^1$ represents a residue of a polyoxyalkylene glycol monoalkyl ether.

The "residue of the diol of a noncyclic hydrocarbon or a cyclic hydrocarbon" means, in the structure of the starting material of the urethane (meth)acrylate represented by the general formula (3), the moiety not including the functional group forming the urethane bond; specifically, the residue means the moiety ($C^1$) not including the hydroxyl group in the case of the diol of a noncyclic hydrocarbon or a cyclic hydrocarbon.

Furthermore, in the general formula (3), $A^1$, $B^1$, and $D^1$ have the same meaning as $A^1$ and $B^1$ in the general formula (1) and $D^1$ in the general formula (2), respectively, which are already described above and thus the descriptions are not repeated here.

In the general formula (3), n represents a natural number of 1 to 30. Further, the specific numerical value of n is set by adjusting the weight average molecular weight. Diol of Acyclic Hydrocarbon or Cyclic Hydrocarbon The diol of a noncyclic hydrocarbon or a cyclic hydrocarbon is a compound which gives the structure of $C^1$ in the general formula (3). The diol is introduced for the purpose of regulating the degree of the hydrophobicity of the hydrophobic moiety of the urethane (meth)acrylate represented by the general formula (3). The diol is selected so as to provide a satisfactory hydrophobicity. As specific examples, one or more diols selected from the group consisting of aliphatic, alicyclic and aromatic diols each having two hydroxyl groups in one molecule thereof are preferably used; among such diols, diols exhibiting satisfactory hydrophobicity are more preferred. Specifically, because of being particularly excellent in the hydrophobicity, the number of the carbon atoms in the diol of the noncyclic hydrocarbon or the cyclic hydrocarbon is preferably from 6 to 20.

It is also possible to select as the diols, according to the intended use or intended purpose, those diols which are appropriate for controlling the rigidity or flexibility of the urethane (meth)acrylate and exhibit satisfactory hydrophobicity.

As the aliphatic diols, heretofore known aliphatic diols can be used without imposing any particular restrictions as long as the aliphatic diols do not have in the molecule thereof any aromatic structure or any alicyclic structure. Specific examples of the aliphatic diol include 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,18-octadecanediol, 1,19-nonadecanediol, 1,20-eicosanediol, polypropylene glycol (such as dipropylene glycol and tripropylene glycol), an aliphatic polycarbonate polyol, an aliphatic polyester polyol, and an aliphatic polycaprolactone diol.

As the aromatic diols, heretofore known aromatic diols can be used without imposing any particular restrictions as long as the aromatic diols have in the molecule thereof an aromatic structure. Specific examples of the aromatic diol include biphenyl-4,4'-diol, 1,4-benzenediol, bisphenol A, ethylene oxide-modified bisphenol A, propylene oxide-modified bisphenol A, an aromatic polycarbonate polyol, and an aromatic polyester polyol.

As the alicyclic diols, heretofore known alicyclic diols can be used without imposing any particular restrictions as long as the alicyclic diols have in the molecule thereof an alicyclic structure. Specific examples of the alicyclic diol include hydrogenated bisphenol A, ethylene oxide-modified hydrogenated bisphenol A, propylene oxide-modified hydrogenated bisphenol A, 1,4-cyclohexanediol, tricyclodecanedimethanol, an alicyclic polycarbonate polyol, and an alicyclic polyester polyol.

Among these, aliphatic diols and alicyclic diols are preferred since satisfactory emulsification in a solvent is achieved and the cured product of the urethane (meth)acrylate hardly undergoes yellowing due to sun light (ultraviolet rays). Among the aliphatic diols, one or more selected from the group consisting of 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,18-octadecanediol, 1,19-nonadecanediol, 1,20-eicosanediol, polypropylene glycol, an aliphatic polycarbonate polyol, an aliphatic polyester polyol, and an aliphatic polycaprolactone diol are preferred. Among the alicyclic diols, one or more selected from the group consisting of hydrogenated bisphenol A, ethylene oxide-modified hydrogenated bisphenol A, propylene oxide-modified hydrogenated bisphenol A, 1,4-cyclohexanediol, and tricyclodecanedimethanol are preferred.

The diols may be used intramolecularly or intermolecularly singly or in combination of two or more kinds thereof.

Furthermore, when the general formula (3) has a structure derived from a diisocyanate and a structure derived from a diol, it can lower the viscosity of the urethane (meth)acrylate, which will be described now.

The urethane (meth)acrylate synthesized by using an organic polyisocyanate having three or more isocyanate groups in the molecule thereof tends to be high in molecular weight and tends to be high in viscosity. The emulsion (aqueous emulsion) prepared by emulsifying the urethane (meth)acrylate having a structure having a hydrophilic group in the molecule thereof also tends to be high in viscosity of emulsion (aqueous emulsion), in which the main chain is formed of a polyisocyanate having three or more isocyanate groups, and the branched chains are formed of a molecular chain having at least one hydrophilic group and a molecular chain having at least two or more (meth)acryloyl groups.

On the contrary, the urethane (meth)acrylate synthesized by using a diisocyanate having two isocyanate groups in the molecule thereof has a linear structure, in which the structure derived from the diisocyanate and the structure derived from the diol are linearly arranged, and as shown in the general formula (3), there is at one terminal a hydrophilic group derived from polyoxyalkylene glycol monoalkyl ether, and there is arranged at the other terminal a hydrophobic moiety in which to a structure derived from a (meth)acrylate having one or more (meth)acryloyl group and one hydroxyl group, a structure derived from the diol of a noncyclic hydrocarbon or a cyclic hydrocarbon having two hydroxyl groups in the molecule thereof is bonded through diisocyanate by a urethane bond. Due to such a structure as described above, the emulsifiability in a solvent is particularly excellent and the viscosity of the emulsion (emulsion) can be drastically reduced, as compared to the emulsions of the urethane (meth)acrylates in the related art.

1-3. Cross-Linked Urethane (Meth)Acrylate

When the ink composition of the present embodiment includes a cross-linked urethane (meth)acrylate having a constitutional unit including the urethane (meth)acrylate having the structure represented by the general formula (3), it is excellent in curability and superior in the storage stability of the emulsion.

Cross-Linking Agent

The cross-linked urethane (meth)acrylate can be obtained by allowing the above-described urethane (meth)acrylate and a bifunctional or higher functional cross-linking agent to react with each other.

The use of a cross-linking agent enables to increase the molecular weight of the urethane (meth)acrylate. Thus, it is possible to obtain a cross-linked urethane (meth)acrylate superior in curability and superior in the storage stability of the emulsion.

Incidentally, gelation can be prevented by performing the reaction, neither in a solvent system nor in a solvent-free system, but in the oil system (oil phase) in an O/W emulsion.

The bifunctional or higher functional crosslinking agent is preferably hydrophobic because this cross-linking agent reacts with the (meth)acryloyl group. In other words, the bifunctional or higher functional crosslinking agent undergoes the Michael addition, in the oil phase of an emulsion, to the (meth)acryloyl group in the urethane (meth)acrylate represented by the general formula (3), and thus cross-links the urethane (meth)acrylate.

Examples of the cross-linking agent reacting with the (meth)acryloyl group include cross-linking agents having thiol groups, amino groups, or the like in the molecules thereof. Among such cross-linking agents, either of a multifunctional thiol compound and a multifunctional amine compound is preferred because of the capability of allowing the reaction to proceed rapidly, and a multifunctional thiol compound is more preferred.

The bifunctional and higher functional crosslinking agent is not particularly limited, but examples thereof include mercapto group-containing compounds and amino group-containing compounds. Among these compounds, mercapto group-containing compounds are preferred since they are low in solubility in a solvent and tend to be easily incorporated into the oil phase when dispersed in a solvent.

The mercapto group-containing compound is not particularly limited, but examples thereof include pentaerythritol tetrakis(3-mercaptopropionate) (hereinafter also referred to as "PEMP"), trimethylolpropane tris(3-mercaptopropionate), tris-[(3-mercaptopropionyloxy)-ethyl]-isocyanurate, tetraethylene glycol bis(3-mercaptopropionate), dipentaerythritol hexakis(3-mercaptopropionate), pentaerythritol tetrakis(3-mercaptobutyrate) and trimethylolpropane tris(3-mercaptobutyrate).

The content of the bifunctional or higher functional cross-linking agent is preferably from 3 to 10% by mass, and more preferably from 5 to 8% by mass, based on the total mass (100% by mass) of the (meth)acryloyl group-containing resin.

Furthermore, the "(meth)acryloyl group-containing resin" in the present specification means all the resins that contain the (meth)acryloyl groups undergoing cross-linking due to the crosslinking agents. Accordingly, the (meth)acryloyl group-containing resin includes the urethane (meth)acrylate represented by the general formula (3) and the compounds having three or more (meth)acryloyl groups in the molecule thereof as described later.

Furthermore, the weight average molecular weight of the cross-linked urethane (meth)acrylates may be such that the urethane (meth)acrylate having a represented by the general formula (3) which is a structural unit has a weight average molecular weight in the above-described range and is not particularly limited, but is preferably from 2,000 to 8,000.

The urethane (meth)acrylates including the cross-linked urethane (meth)acrylates as described above may also be used singly or in combination of two or more kinds thereof.

The content of the urethane (meth)acrylates which may include the cross-linked urethane (meth)acrylate as described above is preferably from 1 to 60% by mass, more preferably from 5 to 50% by mass, still more preferably from 5 to 40% by mass, even still more preferably from 5 to 20% by mass, and particularly preferably from 5 to 15% by mass, based on the total amount (100% by mass) of the ink composition. If the content falls within the above ranges, when used as an ink composition, a coating film can be formed, and also, coating film performance such as satisfactory film strength and satisfactory adhesion can be obtained.

1-4. Preparation Method for Urethane (Meth)Acrylate

A method for preparing the urethane (meth)acrylate represented by the general formula (3) among the urethane (meth)acrylates as described above will be described. The urethane (meth)acrylate is obtained by allowing the hydroxyl group-containing (meth)acrylate, the diisocyanate, the diol of a non-cyclic hydrocarbon or a cyclic hydrocarbon, and the polyoxy-alkylene glycol monoalkyl ether to react with each other. More specifically, the method for preparing the urethane (meth)acrylate includes the first step, the second step, and the third step.

In the first step, a first urethane bond-containing reaction product represented by the following general formula (3a) by allowing the diisocyanate and the diol of a noncyclic hydrocarbon or a cyclic hydrocarbon preferably having 6 to 20 carbon atoms to react with each other:

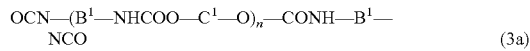

OCN—(B¹—NHCOO—C¹—O)ₙ—CONH—B¹—NCO    (3a)

In the first step, the molar ratio between the diisocyanate and the diol of a noncyclic hydrocarbon or a cyclic hydrocarbon having 6 to 20 carbon atoms is preferably from 5:1 to 5:4, and more preferably from 5:2 to 5:3.

In the second step, a second reaction product represented by the following general formula (3b) is obtained by allowing the first reaction product and the polyoxyalkylene glycol monoalkyl ether to react with each other:

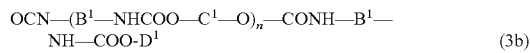

OCN—(B¹—NHCOO—C¹—O)ₙ—CONH—B¹—
NH—COO-D¹    (3b)

In the second step, the molar ratio between the first reaction product and the polyoxyalkylene glycol monoalkyl ether is preferably from 1:0.5 to 1:1 since the emulsification in the solvent is improved.

In the third step, the second reaction product and the hydroxyl group-containing (meth)acrylate are allowed to react to each other. In the third step, the molar ratio between the second reaction product and the hydroxyl group-containing (meth)acrylate is preferably from 1:1.5 to 1:1, and more preferably from 1:1.4 to 1:1.2.

1-5. Method for Preparing Cross-Linked Urethane (Meth)Acrylate

The method for preparing the cross-linked urethane (meth)acrylate is a method for preparing the cross-linked urethane (meth)acrylate above. The preparation method includes a fourth stage in which the urethane (meth)acrylate represented by the general formula (3), obtained by performing the first step through the third step and the bifunctional or higher functional cross-linking agent are allowed to react with each other, so that the urethane (meth)acrylate is cross-linked.

In the fourth stage, in addition to the urethane (meth)acrylate represented by the general formula (3), the compound having three or more (meth)acryloyl groups in the molecule thereof may also be allowed to react with the bifunctional or higher functional cross-linking agent.

In the fourth stage, a urethane (meth)acrylate for fixing may further be added. In particular, when the substrate is made of polyvinyl chloride (hereinafter also referred to as "PVC"), it is preferable to further add a urethane (meth)acrylate for fixing. Specifically, when a PVC substrate is used, the coating film (as described later) is required to have adhesiveness to the PVC substrate. In this connection, the addition of the urethane (meth)acrylate for fixing makes the adhesiveness to the substrate satisfactory, and hence it can be said that the use of the urethane (meth)acrylate for fixing is preferable.

Furthermore, in the case where a substrate made of a material other than PVC, for example, polyethylene terephthalate (PET) is used, the curability is made more satisfactory and the storage stability of the emulsion is superior because of the reason that the particles are fined, and hence the content (addition amount) of the urethane (meth)acrylate for fixing is desirably low, and the content of the compound having three or more (meth)acryloyl groups in the molecule thereof is desirably set at a correspondingly larger value.

In the fourth stage, the ratio between the content of the urethane (meth)acrylate represented by the general formula (3) and (when present) the compound having three or more (meth)acryloyl groups in the molecule thereof and the content of the bifunctional or higher functional cross-linking agent is preferably from 100:1 to 100:10, and more preferably from 100:5 to 100:8 in terms of mass. If the content ratio is equal to or more than the lower limit of the range, the curability and the storage stability become superior. When the content ratio is equal to or less than the upper limit of the range, the occurrence of undissolved substances can be prevented, and the vanishing of the (meth)acryloyl group in the system is prevented and thus the curability can be maintained more satisfactory.

As described above, in the fourth stage, the urethane (meth)acrylate represented by the general formula (3), the bifunctional or higher functional cross-linking agent such as a multifunctional thiol monomer, and one or more, as the optional components, selected from the group consisting of the compound having three or more (meth)acryloyl groups in the molecule thereof, the urethane (meth)acrylate for fixing, the photopolymerization initiator preferably including a thioxanthone-based initiator and a fluorescent brightening agent are mixed together, and the obtained mixture is emulsified (dispersed in a solvent) by dropwise adding the solvent to the mixture. The obtained emulsion is heated, for example, at 80° C. for 6 hours, and consequently the Michael addition reaction is accelerated to obtain the cross-linked urethane (meth)acrylate.

In this case, the compound having a (meth)acryloyl group and the cross-linking agent react with each other and consequently the compound having a (meth)acryloyl group is cross-linked. In other words, the cross-linking agent reacts not only with the urethane (meth)acrylate but with the compound having a (meth)acryloyl group. Accordingly, in the structure of the cross-linked urethane (meth)acrylate, there can be concomitantly present various cross-linked compounds such as a compound obtained from the mutual cross-linking of the urethane (meth)acrylates represented by the general formula (3), a compound obtained from the cross-linking between the urethane (meth)acrylate represented by the general formula (3) and the (meth)acryloyl group-containing compound, which is an included substance, and a compound obtained from the mutual crosslinking of the (meth)acryloyl group-containing compounds, which are included substances. The included substance as referred to herein means a substance present in the interior of a micelle when an emulsion is formed and a micelle structure is obtained.

Moreover, as described above, when the compound having a (meth)acryloyl group and the cross-linking agent are allowed to react with each other, there occur a case where the whole of the compound having a (meth)acryloyl group is cross-linked and a case where part of the compound having a (meth)acryloyl group is cross-linked and the rest of the compound having a (meth)acryloyl group remains uncross-linked. A catalyst may also be used for the purpose of further accelerating the Michael addition reaction.

1-6. Urethane (Meth)Acrylate for Fixing

The ink composition of the present embodiment may include a urethane (meth)acrylate for fixing. Thus, when a coating film including an emulsion is formed on a PVC substrate, the fixability (adhesiveness) of the coating film is made superior.

Incidentally, the urethane (meth)acrylate for fixing is different from the urethane (meth)acrylate as described above.

As described below, the urethane (meth)acrylate for fixing is constituted of a diisocyanate, a diol component having an aromatic skeleton, and a hydroxyl group-containing (meth)acrylate.

In addition, the weight average molecular weight of the urethane (meth)acrylates for fixing is preferably from 1,000 to 10,000, and more preferably from 3,000 to 8,000. In the case where the weight average molecular weight falls within the above range, the urethane (meth)acrylate for fixing is excellent in the adhesiveness of the coating film to the PVC substrate and satisfactory in the stability of the emulsion.

1-6-1. Hydroxyl Group-Containing (Meth)Acrylate

The hydroxyl group-containing (meth)acrylate is used for the introduction of a polymerizable group.

Specifically, the hydroxyl group-containing (meth)acrylate used in the present embodiment is a compound having one or more (meth)acryloyl groups and one hydroxyl group, and the urethanation reaction of the hydroxyl group with one isocyanate group introduces a (meth)acryloyl group(s) to both ends of the main chain of the urethane (meth)acrylate for fixing. The introduction of at least one (meth)acryloyl group enables curing (photopolymerization), and the introduction of two or more (meth)acryloyl groups increases the curing rate and provides an advantageous effect to increase the hardness of the cured product.

The monohydroxy mono(meth)acrylate is not particularly limited, but examples thereof include 2-hydroxyethyl(meth)acrylate, 2-hydroxypropyl(meth)acrylate, polyethylene glycol mono(meth)acrylate, polypropylene glycol mono(meth)acrylate, polycaprolactone mono(meth)acrylate, glycerol di(meth)acrylate, pentaerythritol tri(meth)acrylate, and dipentaerythritol penta(meth)acrylate.

The hydroxyl group-containing (meth)acrylates may be used singly or in combination of two or more kinds thereof.

1-6-2. Diisocyanate

The diisocyanate is not particularly limited, but examples thereof include diisocyanates having a alicyclic hydrocarbon skeleton, such as isophorone diisocyanate; diisocyanates having an aliphatic hydrocarbon skeleton, such as hexamethylene diisocyanate; diisocyanates having an aromatic hydrocarbon skeleton, such as xylylene diisocyanate, tolylene diisocyanate, and diphenylmethane diisocyanate; and diisocyanates having a hydrogenated aromatic hydrocarbon skeleton, such as hydrogenated xylylene diisocyanate and hydrogenated diphenylmethane diisocyanate.

Among these, one or more selected from the group consisting of isophorone diisocyanate, hexamethylene diisocyanate, hydrogenated xylylene diisocyanate, and hydrogenated diphenylmethane diisocyanate are preferred since the cured product of the urethane (meth)acrylate for fixing hardly undergoes yellowing due to sun light (ultraviolet rays).

The diisocyanates may be used intramolecularly or intermolecularly singly or in combination of two or more kinds thereof.

1-6-3. Diol Component Having Aromatic Skeleton

As the diol having an aromatic skeleton, heretofore known diols can be used without imposing any particular restrictions as long as the diols have an aromatic structure in the molecule thereof. Specific examples thereof include biphenyl-4,4'-diol, 1,4-benzenediol, bisphenol A, ethylene oxide-modified bisphenol A, propylene oxide-modified bisphenol A, an aromatic polycarbonate polyol, and an aromatic polyester polyol.

Among these, an aromatic polyester polyol is preferred since it is more satisfactory in the adhesiveness to the PVC substrate. Isophthalate is more preferred among the aromatic polyester polyols.

The diols may be used intramolecularly or inter molecularly singly or in combination of two or more kinds thereof.

The content of the urethane (meth)acrylate for fixing is preferably from 0.5 to 4% by mass, and more preferably from 1 to 3% by mass, based on the total amount (100% by mass) of the photocurable aqueous emulsion because of being superior in the adhesiveness to the PVC substrate and the stability after dispersion in the solvent.

1-7. Polymerizable Compound Other Than Urethane (Meth)Acrylate

The ink composition of the present embodiment includes a polymerizable compound other than the urethane (meth)acrylate. Examples of such a polymerizable compound include a compound having a radical polymerizable group. The compound having a radical polymerizable group undergoes a reaction in a chain-like manner, under the attack of the below-described initiator radical generated by the irradiation of light having a specific wavelength (a specific wavelength range). At the same time, the acryloyl group of the urethane (meth)acrylate present in the same uniform field as the field in which the radical polymerizable compound is present also undergoes a reaction in a chain-like manner. Thus, the ink composition forms a cured film on the recording medium.

Examples of the radical polymerizable group in the compound having a radical polymerizable group include, but are not limited to, a (meth)acryloyl group, a vinyl group, a vinyl ether group, and a mercapto group.

As the compound having a radical polymerizable group included in the ink composition, a compound having in the structure thereof one or more (meth)acryloyl groups is particularly preferred, and a compound having in the structure thereof one or more acryloyl groups is more preferred. The compound having one or more radical polymerizable groups includes a monomer having a molecular weight of about a few hundreds, oligomers ranging from a dimer to a lower polymer consisting of several monomer units, having a molecular weight of approximately several thousands or less, and polymers having a molecular weight of several tens of thousands or less.

The compound having a radical polymerizable group that has one (meth)acryloyl group in the molecule thereof is not particularly limited, but examples thereof include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentenyl (meth)acrylate, dicyclopentenyloxyethyl (meth)acrylate, glycidyl (meth)acrylate, and isobornyl (meth)acrylate.

The compound having a radical polymerizable group that has two (meth)acryloyl groups in the molecule thereof is not particularly limited, but examples thereof include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct of di(meth)acrylate, bisphenol A PO (propylene oxide) adduct of di(meth)acrylate, neopentyl hydroxypivalate glycol di(meth)acrylate, and polytetramethylene glycol di(meth)acrylate.

Among these, compounds having three or more (meth)acryloyl groups in the molecule thereof are more preferred as the compound having a radical polymerizable group since they are excellent in photopolymerizability.

The compound having a radical polymerizable group that has three or more (meth)acryloyl groups in the molecule thereof is not particularly limited, but examples thereof include trimethylolpropane tri(meth)acrylate, ethylene oxide-modified trimethylolpropane tri(meth)acrylate, propylene oxide-modified trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, ditrimethylolpropane tetra(meth)acrylate, glycerol tri(meth)acrylate, glycerin ethoxy tri(meth)acrylate, glycerin propoxy tri(meth)acrylate, caprolactone-modified trimethylolpropane tri(meth)acrylate, pentaerythritol ethoxy tetra(meth)acrylate, epichlorohydrin-modified trimethylolpropane tri(meth)acrylate, tripentaerythritol octa(meth)acrylate, tetrapentaerythritol deca(meth)acrylate, polypentaerythritol poly(meth)acrylate, and caprolactone-modified dipentaerythritol hexa(meth)acrylate.

Moreover, the compound having three or more (meth)acryloyl groups in the molecule thereof is not particularly limited, but examples thereof include oligomers having a molecular weight of approximately several thousands or less and having three or more (meth)acryloyl groups such as polyester(meth)acrylate, polyurethane (meth)acrylate (with the proviso that the urethane (meth)acrylate is excluded), epoxy(meth)acrylate, polyether (meth)acrylate, oligo(meth)acrylate, alkyd (meth)acrylate and polyol (meth)acrylate; oligomers having in the molecule thereof three or more acryloyl groups and having a molecular weight of approximately several thousands or less; and polymer and dendrimer type (meth)acrylates having a molecular weight of approximately several ten thousands or less.

The polymerizable compounds other than the urethane (meth)acrylate may be used singly or in combination of two or more kinds thereof.

Incidentally, since the polymerizable compound other than the urethane (meth)acrylate imparts high photopolymerizability (curability), the content thereof is preferably from 1 to 60% by mass, more preferably from 5 to 50% by mass, still more preferably from 5 to 20% by mass, and even still more preferably from 5 to 15% by mass, based on the total amount (100% by mass) of the ink composition.

In addition, the polymerizable compound in the present embodiment further includes a dispersant having a polymerizable group so as to form a polymer for dispersing a pigment as described later.

2. Photopolymerization Initiator

The ink composition of the present embodiment includes a photopolymerization initiator. The photopolymerization initiator is used to cure an ink present on the surface of a recording medium to form printing, through photopolymerization by irradiation of ultraviolet rays. Among radiation rays, the use of ultraviolet rays (UV) is excellent in terms of safety and is capable of reducing costs of a light source lamp. Although there is no particular limitation on the polymerization initiator as long as it initiates polymerization of the foregoing polymerizable compound through the generation of active species, such as radicals or cationic groups, by energy of radiation (ultraviolet rays), a photoradical polymerization initiator or photocationic polymerization initiator may be used. Among these, a photoradical polymerization initiator is preferably used.

The photoradical polymerization initiator causes photoradical polymerization as follows: the photocleavage, hydrogen abstraction or the like due to the irradiation of the photoradical polymerization initiator with an active energy ray such as ultraviolet rays produces a radical (photoradical polymerization initiator radical), and the radical attacks the urethane (meth)acrylate, the cross-linked urethane (meth)acrylate and the compound having a radical polymerizable group (preferably a radical polymerizable (meth)acrylate).

Examples of the photoradical polymerization initiator include, but are not limited to, aromatic ketones, acylphosphine oxide compounds, aromatic onium salt compounds, organic peroxides, thio compounds (such as a thioxanthone compound and a thiophenyl group-containing compound), α-aminoalkylphenone compounds, hexaarylbiimidazole compounds, ketoxime ester compounds, borate compounds, azinium compounds, metallocene compounds, active ester compounds, compounds having a carbon-halogen bond, and alkylamine compounds.

Among these, particularly from the viewpoint of achieving superior curability of an ink, at least one of an acylphosphine oxide compound and a thioxanthone compound is preferred, and a combination of an acylphosphine oxide compound and a thioxanthone compound are more preferred.

The photoradical polymerization initiator is preferably a hydrophobic photopolymerization initiator since it exhibits a satisfactory emulsifying dispersibility when emulsified and dispersed in a solvent by the urethane (meth)acrylate.

The hydrophobic photopolymerization initiator is not particularly limited, but specific examples thereof include acetophenone, 2,2-diethoxyacetophenone, p-dimethylaminoacetophenone, benzophenone, 2-chlorobenzophenone, p,p'-dichlorobenzophenone, p,p'-bisdiethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyl methyl ketal, 2,2-dimethoxy-1,2-diphenylethan-1-one, 1-hydroxycyclohexyl phenyl ketone, 2-hydroxy-1-{4-[4-(2-hydroxy-2-methylpropionyl)benzyl]phenyl}-2-methylpropan-1-one, 2-benzyl-2-dimethylamino-1-(4-morpholinophenyl)butanone-1,2-dimethylamino-2-(4-methylbenzyl)-1-(4-morpholin-4-yl-phenyl)butan-1-one, 2,4,6-trimethylbenzoyl diphenyl phosphine oxide, bis(2,4,6-trimethylbenzoyl)phenyl phosphine oxide, bis(2,6-dimethoxybenzoyl)-2,4,4-trimethylpentyl phosphine oxide, 2-methyl-1-[4-(methylthio)phenyl]-2-morpholinopropan-1-one, thioxanthone, 2-chlorothioxanthone, 2-methylthioxanthone, 2-isopropylthioxanthone, 4-isopropylthioxanthone, 2-hydroxy-2-methyl-1-phenyl-1-one, 1-(4-isopropylphenyl)-2-hydroxy-2-methylpropan-1-one, methyl benzoyl formate, azobisisobutylonitrile, benzoyl peroxide, and di-tert-butyl peroxide.

Examples of the commercially available product of the photoradical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{(4-[4-(2-hydroxy-2-methyl-propionyl)-benzyl]phenyl-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione-1-[4-(phenylthio)-2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenylacetic acid, 2-[2-oxo-2-phenylacetoxyethoxy]ethyl ester, and oxyphenylacetic acid 2-(2-hydroxyethoxy)ethyl ester) (all manufactured by BASF Corp.); Speedcure TPO, Speedcure DETX (2,4-diethylthioxanthone), and Speedcure ITX (2-isopropylthioxanthone) (all manufactured by Lambson); KAYACURE DETX-S (2,4-diethylthioxanthone (manufactured by Nippon Kayaku Co., Ltd.); Lucirin TPO, LR8893, and LR8970 (all manufactured by BASF Corp.); and Ubecryl P36 (manufactured by UCB Co., Ltd.).

The photopolymerization initiators may be used singly or in combination of two or more kinds thereof.

The content of the photopolymerization initiator is preferably from 0.1 to 10% by mass, and more preferably from 0.5 to 8% by mass, based on the total mass (100% by mass) of the ink. If the content falls within the above range, the curing speed with the ultraviolet rays is sufficiently exhibited, and the coloration derived from the melting residue of the photopolymerization initiator and the photopolymerization initiator can be avoided.

3. Solvent

The ink composition of the present embodiment includes a solvent. The solvent includes at least water or an organic solvent, preferably water, and more preferably water and an organic solvent.

3-1. Water

As the water, pure water or ultrapure water such as ion exchanged water, ultrafiltered water, reverse osmosis water, or distilled water may be used without particular restriction. The content of water is not particularly limited and can be appropriately determined, if necessary. It is preferable to include water since an ink favorable for the environment due to use of less organic solvents is attained or the dispersibility of the polymerizable compound is satisfactory.

3-2. Organic Solvent

Among the organic solvents, a water-soluble organic solvent is preferred. Further, a combination of water and a water-soluble organic solvent is more preferably used. The inclusion of the water-soluble organic solvent in the ink composition enables to prevent the clogging in the vicinity of the nozzles of the head, to appropriately control the permeability of the ink into the recording medium or the spreading of the ink on the recording medium, and to provide the ink with drying property.

Since there are obtained advantageous effects such as the stable discharge stability free from dot depletion, and appropriate wetness and spreading on a wide range of media, the water-soluble organic solvent preferably includes at least either of a polar solvent and a permeable solvent.

The polar solvent is not particularly limited, but examples thereof include 2-pyrrolidone, N-methylpyrrolidone, ε-caprolactam, dimethyl sulfoxide, sulfolane, morpholine, N-ethylmorpholine and 1,3-dimethyl-2-imidazolidinone. The addition of the polar solvent provides an effect to improve the dispersibility of the capsulated pigment particles in the ink composition and enables to improve the discharge stability of the ink.

The polar solvent is preferably a heterocyclic compound, and among these, 2-pyrrolidone, N-methylpyrrolidone, pyrrole, furan, thiophene, imidazole, oxazole, thiazole, pyrazole, isooxazole, isothiazole, pyridine, pyridazine, pyrimidine, pyrazine, piperidine, piperazine, morpholine, 2H-pyran, and 4H-pyran are preferred, and 2-pyrrolidone is more preferred.

Furthermore, the permeable solvent is not particularly limited; examples of the permeable solvent include 1,2-alkanediol, acetylene glycol, alkylene glycol, alkylene glycol alkyl ether and glycol ether. Among these, the use of 1,2-alkanediol enables the more efficient reduction of the coalescence in the recorded matter when printing is made on a recording medium scarcely absorbing or not absorbing ink, such as paper used in running on or a plastic film. Among the 1,2-alkanediols, in particular, 1,2-hexanediol remarkably exhibits such an effect.

Incidentally, the water-soluble organic solvent preferably includes one or more selected from the group consisting of 2-pyrrolidone, glycol ether, 1,2-alkanediol, alkylene glycol, and alkylene glycol alkyl ether.

The 1,2-alkanediol is not particularly limited, but specific examples thereof include 1,2-octanediol, 1,2-hexanediol, 1,2-pentanediol, and 4-methyl-1,2-pentanediol.

The alkylene glycol is not particularly limited, but specific examples thereof ethylene glycol, diethylene glycol, triethylene glycol, tetraethylene glycol, propylene glycol, and dipropylene glycol monomethyl ether.

Moreover, the alkylene glycol alkyl ether which is liquid under ordinary temperature and ordinary pressure is not particularly limited, but examples thereof include ethylene glycol-based ethers and propylene glycol-based ethers containing as the basic components the aliphatic groups such as methyl, n-propyl, i-propyl, n-butyl, i-butyl, hexyl and 2-ethylhexyl and the double bond-containing groups such as allyl and phenyl. These are colorless and low in odor and each have an ether group and a hydroxyl group in the molecule thereof, and hence are each a component liquid at ordinary temperature provided with the properties of both of an alcohol and an ether. The alkylene glycol alkyl ethers include a monoalkyl ether type in which one hydroxyl group is substituted and a dialkyl ether type in which both hydroxyl groups are substituted, and can be used in combinations of plural kinds thereof.

The alkylene glycol alkyl ether is not particularly limited; however, specific examples of alkylene glycol alkyl ether include alkylene glycol monoalkyl ethers such as ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (TEGmBE), tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and polyethylene glycol dimethyl ether.

In addition, alkylene glycol monoalkyl ether acetate, which is a derivative of the alkylene glycol monoalkyl ether can also be used. The alkylene glycol monoalkyl ether acetate is not particularly limited, but examples thereof include ethylene glycol monoethyl ether acetate, diethylene glycol monoethyl ether acetate, propylene glycol ether acetate, and dipropylene monoethyl ether acetate.

The organic solvents may be used singly or in combination of two or more kinds thereof. In the case of not using them in combination with water, organic solvents other than the water-soluble organic solvents may be used.

For the purpose of ensuring appropriate physical property values (viscosity and the like), appropriate printing quality, and reliability of the ink, the organic solvent is included preferably in a content of 1 to 40% by mass, and more preferably in a content of 2 to 30% by mass, based on the total amount (100% by mass) of the ink composition.

4. Fluorescent Brightening Agent

The ink composition of the present embodiment may further include a fluorescent brightening agent. Thus, the curability is made superior.

The fluorescent brightening agent is classified as a sensitizer. The fluorescent brightening agent is a colorless or slightly colored compound capable of absorbing light having a peak wavelength approximately in a range from near ultraviolet to short wavelength (visible) light, namely, a wavelength range from 300 to 450 nm and capable of emitting fluorescence having a peak wavelength approximately in a range from 400 to 500 nm. The fluorescent brightening agent is also known as the fluorescent whitening agent. The physical principles and the chemical properties of the fluorescent brightening agent is described in Ullmann's Encyclopedia of Industrial Chemistry, Sixth Edition, Electronic Release, Wiley-VCH, 1998.

The fluorescent brightening agent is excited to an excitation state with an active energy ray and can accelerate the generation of useful groups such as radicals and acids by the interactions such as energy transfer and electron transfer with other substances such as radical generating agents and acid generating agents. Examples of the case of the occurrence of such interactions include a case where the energy level of the triplet excitation state of the fluorescent brightening agent molecule and the energy level of the triplet excitation state of the radical generating agent or the acid generating agent are extremely close to each other, and additionally, the energy level of the triplet excitation state of the radical generating agent or the acid generating agent is slightly lower than the energy level of the triplet excitation state of the fluorescent brightening agent. Actually, it is required that the fluorescent brightening agent be capable of capturing the irradiation light in a wavelength band of from 350 nm to 450 nm, and additionally, the energy level of the triplet excitation state of the fluorescent brightening agent have the specific relation with the energy level of the triplet excitation state of the radical generating agent or the acid generating agent. In order to meet this requirement, it is required that the energy level of the singlet exited state and the energy level of the triplet excitation state be close to each other. Accordingly, also included is the case where the fluorescent brightening agent is used from the viewpoint of the interaction with the radical generating agent or the acid generating agent, and at the same time, the absorption wavelength band of the photopolymerization initiator overlaps with the absorption wavelength band of the fluorescent brightening agent from the viewpoint of the generation efficiency, as the ink liquid, of the radical or acid with respect to the irradiation wavelength. In this case, the fluorescent brightening agent in the present embodiment has an absorption region in the wavelength band at least partially overlapping with the absorption wavelength band of the photopolymerization initiator, capable of performing cleavage thereof.

The fluorescent brightening agent is not particularly limited, but examples thereof include naphthalene benzoxazolyl derivatives, thiophene benzoxazolyl derivatives, stilbene benzoxazolyl derivatives, coumarin derivatives, styrene biphenyl derivatives, pyrazolone derivatives, stilbene derivatives, styryl derivatives of benzene and biphenyl, bis(benzazol-2-yl) derivatives, carbostyrils, naphthalimides, derivatives of dibenzothiophene-5,5'-dioxide, pyrene derivatives, and pyridotriazoles. These may be used singly or in combination of two or more kinds thereof.

Examples of the commercially available product of the fluorescent brightening agent include TINOPAL OB manufactured by BASF Corp. and HOSTALUX KCB (1,4-bis(2-benzoxazolyl)naphthalene) manufactured by Clariant (Japan) K.K.

The fluorescent brightening agent has a feature such that the maximum absorbance of the fluorescent brightening agent per a predetermined concentration in a wavelength band of from 360 nm to 420 nm is larger than the maximum absorbance per the same concentration as the predetermined concentration of the photopolymerization initiator in the wavelength band. The present inventors have found that the fulfillment of this feature results in an ink composition extremely excellent in curability.

In the design method for allowing the photopolymerization initiator and the fluorescent brightening agent to fulfill the feature, the absorption spectrum, and the maximum absorbance and the peak wavelength of the absorption spectrum of each of the photopolymerization initiator to be used and the fluorescent brightening agent to be used are analyzed. Then, it is only required to verify whether or not the relation between the maximum absorbance of the photopolymerization initiator and the maximum absorbance of the fluorescent brightening agent fulfills the feature.

When an ultraviolet light-emitting diode (LED) is used as the light source used for measuring the absorption spectra of the fluorescent brightening agent and the photopolymerization initiator, LEDs having a light emission peak in a wavelength band of from 360 nm to 420 nm are usable. The wavelength of the LED is not limited to the wavelength in the case where a single LED is used, and a plurality of LEDs may be used in combination so as for the light source to have a plurality of light emission peaks. For example, LEDs respectively having the peak wavelengths of 365 nm, 385 nm, 395 nm, and 405 nm may be used in combinations of plural kinds thereof.

The fluorescent brightening agents may be used singly or in combination of two or more kinds thereof. Further, the fluorescent brightening agent is included preferably in a content of 0.01% by mass to 0.5% by mass, based on the total mass (100% by mass) of the photocurable aqueous emulsion. If the content falls within the above range, the photocurability is made satisfactory, and the effect of the fluorescent brightening agent itself possibly exerting on the hue of the cured film can be reduced.

5. Color Material

The ink composition of the present embodiment may include a color material. The color material may be at least either of a pigment and a dye.

5-1. Pigment

The use of a pigment as a color material may improve lightfastness of the ink. Either of an inorganic pigment and an organic pigment may be used as the pigment.

As the inorganic pigment, carbon black (C.I. Pigment Black 7) such as furnace black, lamp black, acetylene black, and channel black, iron oxide, and titanium oxide may be used.

Examples of the organic pigment include azo pigments such as an insoluble azo pigment, a condensed azo pigment, an azo lake pigment, and a chelate azo pigment; polycyclic pigments such as a phthalocyanine pigment, a perylene pigment, a perinone pigment, an anthraquinone pigment, a quinacridone pigment, a dioxane pigment, a thioindigo pigment, an isoindolinone pigment, and a quinophthalone pigment; a dye chelate (a basic dye type chelate and an acidic dye type chelate), a dye lake (a basic dye type lake and an acidic dye type lake), a nitro pigment, a nitroso pigment, aniline black, and a daylight fluorescent pigment.

More specifically, examples of carbon black used in a black ink include No. 2300, No. 900, MCF88, No. 33, No. 40, No. 45, No. 52, MA7, MA8, MA100, and No. 2200 B (all manufactured by Mitsubishi Chemical Corporation), Raven 5750, Raven 5250, Raven 5000, Raven 3500, Raven 1255, and Raven 700 (all manufactured by Carbon Columbia), Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400 (all manufactured by Cabot Japan K. K.), and Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (all manufactured by Degussa), and Microlith Black 0066 K (formerly Microlith Black C-K, manufactured by BASF Corp.).

Examples of the pigment used in a white ink include C.I. Pigment White 6, 18, and 21.

Examples of the pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of the pigment used in a cyan ink include C.I. Pigment Blue 1, 2, 3, 15, 15:1, 15:2, 15:3, 15:34, 15:4, 16, 18, 22, 25, 60, 65, and 66, and C.I. Vat Bleu 4 and 60.

In addition, examples of pigments other than the magenta, cyan and yellow pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

These pigments may be used singly or in a combination of two or more kinds thereof.

In the case where the pigment is used, the average particle diameter of the pigment is preferably 300 nm or less, and more preferably from 50 to 200 nm. If the average particle diameter of the pigment falls within the above range, the ink is superior in terms of reliability such as discharge stability and dispersion stability, in conjunction with the formation of an image with excellent image quality. Here, the average particle diameter in the present specification is measured by a dynamic light scattering method.

5-2. Dispersion of Pigment

The pigments are preferably added to ink as pigment dispersions obtained by dispersing the pigments in a solvent with the aid of dispersing agents, or alternatively, as pigment dispersions obtained by dispersing self-dispersing surface-treated pigments having hydrophilic groups introduced onto the surface of the pigments in a solvent by taking advantage of a chemical reaction, or as pigment dispersions obtained by dispersing pigments coated with a polymer in a solvent.

The dispersing agents used in preparation of the former, namely, the pigment dispersions obtained by dispersing in a solvent with the aid of dispersing agents are not particularly limited, but examples thereof include polymer dispersing agents (proteins such as glue, gelatin, casein, and albumin; natural rubbers such as gum arabic and gum tragacanth; glucosides such as saponin; fermentation products of alginic acid such as propylene glycol alginate, triethanolamine alginate, and ammonium alginate; cellulose derivatives such as methyl cellulose, carboxymethyl cellulose, and ethylhydroxy cellulose; polyvinyl alcohols; polypyrrolidones; acrylic resins such as a polyacrylic acid, an acrylic acid-acrylonitrile copolymer, a potassium acrylate-acrylonitrile copolymer, a vinyl acetate-acrylic acid ester copolymer, and an acrylic acid-acrylic acid ester copolymer; styrene-acrylic resins such as a styrene-acrylic acid copolymer, a styrene-methacrylic acid copolymer, a styrene-methacrylic acid-acrylic acid ester copolymer, and a styrene-m-methylstyrene-acrylic acid copolymer; vinyl acetate-based copolymers such as a styrene-maleic acid copolymer, a styrene-maleic anhydride copolymer, a vinylnaphthalene-acrylic acid copolymer, a vinyl acetate-ethylene copolymer, a vinyl acetate-fatty acid vinyl ethylene copolymer, a vinyl acetate-maleic acid ester copolymer, a vinyl acetate-croton copolymer, and a vinyl acetate-acrylic acid copolymer, and the salts of these), and surfactants (various anionic surfactants, nonionic surfactants, amphoteric surfactants, and the like).

On the other hand, of the latter pigments, the self-dispersing surface-treated pigments having hydrophilic groups introduced into the pigments are such that the pigments are made capable of being dispersed or dissolved in a solvent without using any dispersing agent by the surface treatment in which carboxyl groups and the salts of such groups are directly bonded onto the surface of the pigments. Specifically, such pigments can be obtained by grafting functional groups or functional group-containing molecules to the surface of the pigments with the aid of a physical treatment such as vacuum plasma treatment or a chemical treatment using an oxidant such as sodium hypochlorite or ozone. A single type of functional group or a plurality of types of functional groups may be grafted to one pigment particle. The types of the grafted functional groups and the grafting extent may be appropriately determined in consideration of the factors such as the dispersion stability in the ink, the color concentrations and the dryness of the front face of the ink jet head.

Also, of the latter pigments, the pigments coated with the polymer are not particularly limited; however, for example, such pigments can be obtained in such a way that the pigments are dispersed with the aid of dispersing agents each having a polymerizable group, and then emulsion polymerization is performed in a solvent by using a monomer (copolymerizable monomer) copolymerizable with the dispersing agent and a photopolymerization initiator. Among such polymers, preferably usable are the polymers obtained in such a way that a monomer or an oligomer having as double bonds at least any of an acryloyl group, a methacryloyl group, a vinyl group and an allyl group is polymerized by a heretofore known polymerization method using a photopolymerization initiator. For the emulsion polymerization, common methods can be used; the polymerization proceeds due to a free radical generated by thermolysis of the water-soluble photopolymerization initiator in the presence of an emulsifying agent.

Here, the dispersant having a polymerizable group is included in the polymerizable compound in the present embodiment. Examples of the dispersant having a polymerizable group include, but are not limited to, water-based photocurable aliphatic urethane (meth)acrylates. Examples of a commercially available dispersant having a polymerizable group include, but are not limited to, Laromer 8949, Laromer 8983, and Laromer 9005 (all manufactured by BASF Corp.).

The dispersants may each be used singly or in combination of two or more kinds thereof.

5-3. Dye

A dye may be used as a color material. There is no particular limitation on the dye, and an acidic dye, a direct dye, a reactive dye, or a basic dye may be used. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

These dyes may be used singly or in a combination of two or more kinds thereof.

The content of the color material is preferably from 1 to 20% by mass, based on the total mass (100% by mass) of the ink, from the viewpoint of excellent masking property and color reproducibility.

6. Surfactant

The ink composition of the present embodiment may include a surfactant. The surfactant is not particularly limited; however, for example, silicone-based surfactants such as polyester-modified silicone and polyether-modified silicone may be used; and polyether-modified polydimethylsiloxane or polyester-modified polydimethylsiloxane are particularly preferably used. Specific examples of the silicone-based surfactant include BYK-331, BYK-333, BYK-375, BYK-347, BYK-348, BYK-349, and BYK-UV 3500, 3510, 3530, and 3570 (all manufactured by BYK-Chemie Japan Co., Ltd.).

The surfactants may be used singly or in combination of two or more kinds thereof.

Since there is obtained an advantageous effect of dot spreading on the media, the surfactant is included preferably in a content of 0.01 to 3% by mass, and more preferably 0.02 to 2% by mass, based on the total amount (100% by mass) of the ink composition.

7. pH Adjusting Agent

The ink composition of the present embodiment may include a pH adjusting agent. Examples of the pH adjusting agent include, but are not limited to, alkali metal salts such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, and tripropanolamine.

The content of the pH adjusting agent is not particularly limited, and may be appropriately determined, as desired.

8. Photocurable Aqueous Emulsion

The polymerizable compound is preferably in the dispersion state, and more preferably in the form of an emulsion, and is included in the photocurable ink composition of the present embodiment. To be more specific about the form of the emulsion out of the two forms, a photocurable aqueous emulsion is preferably formed, in the ink composition of the present embodiment, by at least either of the urethane (meth)acrylate and the cross-linked urethane (meth)acrylate having the respective structural units represented by the general formulae (1) and (2), and the polymerizable compound other than the compounds above, and a photopolymerization initiator. In this case, the ink composition is excellent in curability based on irradiation of ultraviolet rays in the presence of a solvent (in particular, water and a water-soluble organic solvent), and odor can be effectively suppressed. The photocurable aqueous emulsion can be composed of at least either of the urethane (meth)acrylate and the cross-linked urethane (meth)acrylate, and the polymerizable compound and the photopolymerization initiator emulsified and dispersed in a solvent by at least either of the urethane (meth)acrylate and the cross-linked urethane (meth)acrylate.

The curability is made excellent by including a photopolymerization initiator and a polymerizable compound in an emulsion of an amphiphilic linear urethane (meth)acrylate. The urethane (meth)acrylate is an amphiphilic substance, and hence adoption of a linear structure for the molecular structure of the urethane (meth)acrylate to obtain a photocurable aqueous emulsion achieving advantageous effects such that the emulsion is stable and excellent in dispersibility, and is low in viscosity.

It is thought that the above-described effects due to the photocurable aqueous emulsion are brought about by the following reasons.

Figure 2:
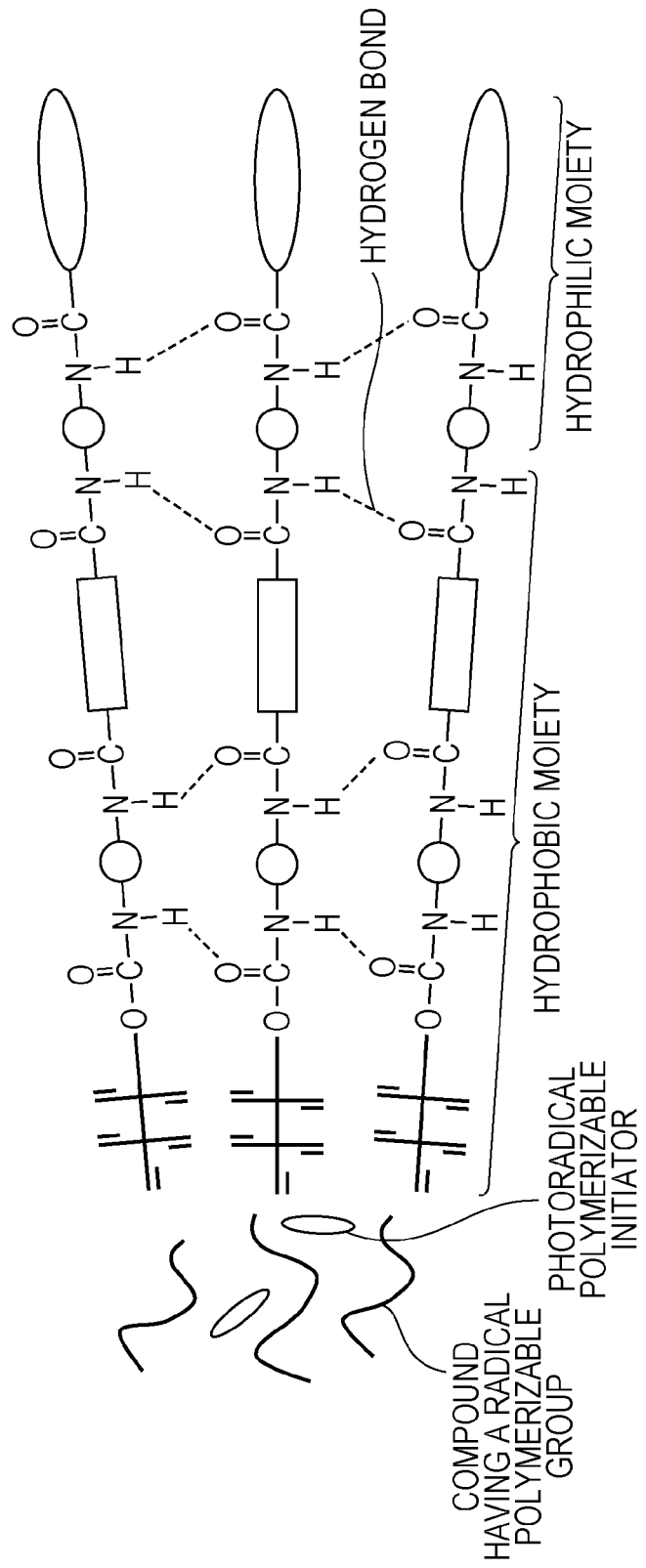
FIG. 2 is a schematic diagram microscopically illustrating the photocurable aqueous emulsion in the invention.

FIG. 1 is a schematic diagram macroscopically illustrating the photocurable aqueous emulsion, and FIG. 2 is a schematic diagram microscopically illustrating the photocurable aqueous emulsion. As shown in FIGS. 1 and 2, the urethane (meth)acrylate probably forms micelles in a solvent in such a way that the hydrophobic moiety is directed toward the core and the hydrophilic moiety is directed toward the solvent-free water phase to form the shell layer, and thus the urethane (meth)acrylate probably can form micelles including the polymerizable compound (preferably radical polymerizable (meth)acrylate) and the photopolymerization initiator with respect to a solvent phase (water phase).

Such a micelle formation as described above is probably ascribable to the molecular structure of the urethane (meth)acrylate. Specifically, in the micelle formation, the molecular structure of the urethane (meth)acrylate is smaller in steric hindrance as compared to the case where the main chain is branched or the main chain has hydrophobic moieties at both terminals thereof, and is probably free from bend conformation. Accordingly, it becomes possible that the urethane (meth)acrylate is regularly densely oriented with the hydrophilic moiety directed toward the solvent phase. Thus, in the micelle in which the urethane (meth)acrylate molecules are densely oriented, the hydrogen bonds between the urethane bonds operate effectively to increase the micelle formation intensity (packing property) so as to probably contribute to the stability and the dispersibility of the micelles.

Probably thus, the photocurable aqueous emulsion is excellent in stability and a satisfactory photopolymerizability is obtained even when the polymerizable compound (preferably, radical polymerizable (meth)acrylate) and the photopolymerization initiator are included in the micelles.

Moreover, as for the photocurable aqueous emulsion, a person having ordinary skill in the art may select appropriate methods by appropriately improving and modifying the methods performed in the below described examples; thus, heretofore known methods such as emulsion polymerization, high pressure emulsification and phase inversion emulsification may be adopted. Within the above range not impairing the advantageous effects of the invention, heretofore known various emulsifying agents and dispersing agents may also be used, as desired.

Furthermore, the emulsion polymerization is a method in which an amphiphilic substance such as a surfactant is added in the solvent phase, and then an oil phase is added to the solvent phase. The high pressure emulsification method is a method in which a solvent phase, an oil phase and an amphiphilic substance such as a surfactant are preliminarily mixed, and the obtained mixture is emulsified with a high pressure emulsifying machine such as a homogenizer to obtain an aqueous emulsion. The inversion emulsification method is a method in which an amphiphilic substance such as a surfactant is dissolved or dispersed in an oil phase, and a water phase is added to the oil phase to obtain an O/W type emulsion. The continuous phase is inverted from water to oil (inverse phase) midway through the emulsification, and hence this emulsification is referred to as the phase inversion emulsification. In this connection, the surfactant is not limited to the following examples; however, examples of such a surfactant include sodium alkylsulfonate, alkyl sulfate ester sodium, alkyl ether sulfate ester sodium, polyoxyethylene alkyl ether, polyoxyethylene alkyl phenyl ether, alkylamino fatty acid sodium salts, and alkyl trimethyl ammonium salts.

Furthermore, in the ink composition of the present embodiment, when at least either of the urethane (meth)acrylate and the cross-linked urethane (meth)acrylate having the respective structural units represented by the general formulae (1) and (2), the polymerizable compound and the photopolymerization initiator constitute the photocurable aqueous emulsion, the average particle size of the emulsion is preferably from 30 to 2,000 nm, and more preferably from 50 to 1,000 nm. The average particle size of the photocurable aqueous emulsion falling within the above range makes the discharge stability more satisfactory.

The average particle size of the photocurable aqueous emulsion can be regulated by varying the molecular sizes of the urethane (meth)acrylate and the cross-linked urethane (meth)acrylate having the respective structural units represented by the general formulae (1) and (2). Accordingly, the starting materials of the urethane (meth)acrylate and the cross-linked urethane (meth)acrylate having the respective structural units represented by the general formulae (1) and (2) may be appropriately varied. The average particle size of the photocurable aqueous emulsion can also be regulated by a heretofore known method; for example, the stirring speed, the emulsifying agent or the like in preparation of the photocurable aqueous emulsion may be appropriately improved or varied.

Moreover, the average particle size in the present specification means the particle size at cumulative 50% by volume and is measured by dynamic light scattering. The average particle size can be measured, for example, by using the Microtrac UPA150 (trade name, manufactured by Microtrac Inc.).

Furthermore, when the photocurable aqueous emulsion is prepared by using the cross-linked urethane (meth)acrylate, either of the emulsion formation and the cross-linking reaction may come first. Among them, when the cross-linking reaction follows the establishment of the emulsified state, gelation can be effectively prevented, and hence, it is preferable to perform the cross-linking reaction in the emulsion state following emulsification.

In addition, the counterpart of the cross-linking reaction based on the cross-linking agent is not limited to the urethane (meth)acrylate having each of the structural units represented by the general formulae (1) and (2), but may also be other included substances such as the compound having three or more (meth)acryloyl groups in the molecule thereof.

As described above, the ink composition including the photocurable aqueous emulsion using the urethane (meth)acrylate is low in viscosity, excellent in curability, photocurable in the presence of a solvent, and additionally excellent in hydrolysis resistance. In particular, in the form in which the polymerizable compound and the photopolymerization initiator are included in the micelles formed by the urethane (meth)acrylate, the photocurable aqueous emulsion can acquire the excellent curability and the performance of being photocurable even in the presence of a predetermined concentration of the solvent, wherein such performance is not found in photocurable aqueous emulsions in the related art. The urethane (meth)acrylate forming the micelles of the photocurable aqueous emulsion is capable of densely orienting due to the structure thereof, and further strong bonding force due to hydrogen bond probably operates between the arranged urethane (meth)acrylate molecules because the urethane (meth)acrylate has the urethane bonds (urethane groups) in the hydrophobic moiety in the structure thereof. It is thought that this has made it possible to obtain a stable emulsion in which the included substances in the micelles hardly leak and hydrolysis hardly occurs.

Furthermore, the reasons for the fact that the photocurable aqueous emulsion is excellent in photopolymerizability (curability) and additionally is polymerized (cured) with light even in the presence of a predetermined concentration of the solvent are not yet clear; however, the reasons are inferred as follows. As described above, the photocurable aqueous emulsion takes the state such that the urethane (meth)acrylate forms in a solvent spherical micelles including in the core thereof the polymerizable compound and the photopolymerization initiator; in this state, light irradiation does not cause polymerization (curing). When the photocurable aqueous emulsion is applied to a recording medium and dried so as to have a predetermined concentration, light irradiation can cause polymerization (curing) even in the condition such that the solvent remains, and thus a satisfactory adhesion to the recording medium can be obtained. This is presumably because the decrease of the solvent concentration allows the spherical micelles to form a lamellar structure under the condition that the spherical micelles hold in the interior thereof the polymerizable compound and the photopolymerization initiator; and irradiation of the lamellar structure with light allows the photoradical polymerization initiator in the interior of the lamellar structure to be the initiator radical, and the initiator radical attacks the compound having a radical polymerizable group and the acryloyl group of the urethane (meth)acrylate to cause a chain reaction. This presumption is made for the purpose of describing the curability of the photocurable aqueous emulsion, but is not construed to limit the photocurable aqueous emulsion in the present embodiment.

The ink composition of the present embodiment can be obtained by, for example, mixing a pigment, a water-soluble organic solvent, a surfactant, at least either of a predetermined urethane (meth)acrylate and a cross-linked product of the urethane (meth)acrylate (cross-linked urethane (meth)acrylate), a polymerizable compound, a photopolymerization initiator, and a solvent. Further, among them, the urethane (meth)acrylate, the polymerizable compound, and the photopolymerization initiator preferably form a photocurable aqueous emulsion as described above.

In the case where the photocurable aqueous emulsion including at least either of the urethane (meth)acrylate and the cross-linked urethane (meth)acrylate, the polymerizable compound and the photopolymerization initiator is used in the ink composition of the present embodiment, the mass ratio between the content of the nonvolatile component (solid content) of the photocurable aqueous emulsion and the content of the solid content of the pigment can be set to 1:1 to 100:1. The mass ratio made to fall within this range provides advantageous effects such that a coating film excellent in the film strength and the adhesiveness can be obtained independently of the concentration of the pigment included in the ink, and additionally an ink excellent in discharge stability can be obtained. Preferably, the mass ratio made to fall within the range of 3:1 to 70:1 enables to further improve the effects.

9. Other Additives

In addition, the ink composition of the present embodiment may include other additives (components) in addition to the additives mentioned above. These components are not particularly limited, but examples thereof include a polymerization accelerator, a polymerization inhibitor, a penetration enhancer, a wetting agent (humectant), and other additive agents known in the related art. Examples of other additive agents as described above include a fixer, a fungicide, an antiseptic agent, an antioxidant, an ultraviolet ray absorber, a chelate agent, and a thickner known in the related art.

EXAMPLES

Hereinafter, the embodiments of the invention are more specifically described with reference to Examples, but the present embodiments are not limited only to these Examples.
Materials Used The materials used in Examples and Comparative Examples below are as follows.

Synthesis Materials for Urethane Acrylate

A: Hydroxyl group-containing acrylates

Polypropylene glycol monoacrylate having a weight average molecular weight of 400 (Blenmer AP-400 [trade name] manufactured by NOF Corp.) (hereinafter referred to as "PPG acrylate")

Pentaerythritol triacrylate (Aronix M-305 [trade name] manufactured by Toagosei Co., Ltd.)

Dipentaerythritol pentaacrylate, dipentaerythritol hexaacrylate (Aronix M-403 [trade name] manufactured by Toagosei Co., Ltd., the content of dipentaerythritol pentaacrylate: 50 to 60% by mass)

B: Diisocyanate

Isophorone diisocyanate (hereinafter referred to as "IPDI")

C: Diol of noncyclic hydrocarbon or alicyclic hydrocarbon having 6 to 20 carbon atoms 1,12-Dodecanediol·polypropylene glycol having a weight average molecular weight of 400 (Uniol D-400 [trade name] manufactured by NOF Corp.)

D: Polyoxyalkylene glycol monoalkyl ethers

Polyethylene glycol monomethyl ether having a weight average molecular weight of 400 (methoxy PEG 400 [trade name] manufactured by Toho Chemical Industry Co., Ltd.) (hereinafter referred to as "methoxy PEG 400")

Polyethylene glycol monomethyl ether having a weight average molecular weight of 1000 (trade name: methoxy PEG 1000, manufactured by Toho Chemical Industry Co., Ltd.) (hereinafter referred to as "methoxy PEG 1000")

Polyethylene glycol monomethyl ether having a weight average molecular weight of 2000 (Uniox M-2000 [trade name] manufactured by NOF Corp.) (hereinafter also referred to as "methoxy PEG 2000")

Synthesis Material for Cross-Linked Urethane Acrylate

In addition to the above compounds, pentaerythritol tetrakis-3-mercaptopropionate (cross-linking thiol, hereinafter also referred to as "PEMP") was used as a cross-linking agent.

Pigments

C.I. Pigment Black 7 (hereinafter also referred to as "black pigment")

C.I. Pigment Yellow 180 (hereinafter also referred to as "yellow pigment")

C.I. Pigment Red 122 (hereinafter also referred to as "magenta pigment")

C.I. Pigment Blue 15:3 (hereinafter also referred to as "cyan pigment")

Polymerizable Compounds

Polyethylene glycol diacrylate (number of the repeating ethylene glycols: 9)

Laromer 8949 (urethane-based resin dispersion, trade name, manufactured by BASF Corp.)

Photocurable aqueous emulsion (q-2) (hereinafter also referred to as "EM q-2". For the preparation method therefor, see Synthesis Example 3 as described later)

Photocurable aqueous emulsion (e-1) (hereinafter also referred to as "EM e-1". For the preparation method therefor, see Synthesis Example 4 as described later)

Photocurable aqueous emulsion (e-5) (hereinafter also referred to as "EM e-5". For the preparation method therefor, see Synthesis Example 5 as described later)

In addition, since the photocurable aqueous emulsion includes the polymerizable compound, these are described in the section of the "Polymerizable Compound".

Urethane acrylate for fixing (for the preparation method, see Preparation Example 1 as described later) Photopolymerization Initiator Acylphosphine oxide-based photopolymerization initiator (DAROCUR TPO [trade name] manufactured by BASF Corp.) (hereinafter also referred to as "TPO")

Thioxanthone-based photopolymerization initiator (Speedcure DETX [trade name] manufactured by manufactured by Lambson Ltd.) (hereinafter also referred to as "DETX")

Fluorescent Brightening Agent 1,4-Bis(2-benzoxazolyl)naphthalene (HOSTALUX KCB [trade name] manufactured by Clariant (Japan) K.K.) (hereinafter also referred to as "KCB")

Water-Soluble Organic Solvent

2-Pyrrolidone (hereinafter also referred to as "2-P")

Propylene glycol (hereinafter also referred to as "PG")

1,2-Hexanediol (hereinafter also referred to as "1,2-HD")

Surfactant

Polyether modified siloxane (BYK-349 [trade name] manufactured by BYK-Chemie Japan Co., Ltd.)

Polyether modified polydimethylsiloxane (BYK-333 [trade name] manufactured by BYK-Chemie Japan Co., Ltd.)

pH Adjusting Agent

Tripropanolamine (hereinafter also referred to as "TPA")

Structure and Synthesis of Urethane Acrylate

1. Structure of Urethane Acrylate

As the urethane acrylates used in Examples and Comparative Examples below, the urethane acrylates having the structures represented by the general formula (3) and the following general formula (5), respectively, are used:

$$A^1-O-CONH-B^1-\overset{H}{\underset{|}{N}}-COO-D^2 \quad (5)$$
$$A^1-O-CONH$$

wherein $A^1$ represents a structure derived from a hydroxyl group-containing acrylate having one or more acryloyl groups, $B^1$ represents a structure derived from a diisocyanate, $C^2$ represents a structure derived from a diol, and $D^2$ and $D^3$ each represent a structure derived from a polyoxyethylene glycol with one terminal thereof blocked with a methyl group (hereinafter also referred to as "polyoxyethylene glycol monomethyl ether"), out of the compounds represented by the general formula (4).

2. Synthesis of Amphiphilic Urethane Acrylate 2-1. Synthesis Example 1

Synthesis of Amphiphilic Urethane Acrylate (q)

In a reaction vessel equipped with a stirrer, a condenser tube, a dropping funnel, and an air introduction tube, 578.0 parts by mass of a trimer of HMDI (Coronate HXR, manufactured by Nippon Polyurethane Industry Co., Ltd.), 200.0 parts by mass of methoxy PEG 400, and 200.0 parts by mass of methoxy PEG 1000 were placed, and while stirring the mixture, 0.39 parts by mass of tin octylate was added to the mixture, the temperature inside the reaction vessel was increased to 75° C., and the obtained mixture was allowed to react for 1.5 hours. Then, 1051.6 parts by mass of pentaerythritol triacrylate, 1.01 parts by mass of methoquinone, and 0.81 parts by mass of tin octylate were placed in the reaction vessel and mixed, and under air bubbling, the temperature inside the reaction vessel was increased to 80° C., and the obtained mixture was allowed to react for 2 hours. Then, the reaction mixture was cooled to obtain a urethane acrylate (q). Further, the urethane acrylate (q) is a urethane acrylate in which one terminal group is an acryloyl group and for which a trifunctional isocyanate was used, and is represented by the general formula (5). The weight average molecular weight of the urethane acrylate (q) was 7,400.

2-2. Synthesis Example 2

Synthesis of Amphiphilic Urethane Acrylate (e)

In the same reaction vessel as in Synthesis Example 1, 444.6 parts by mass (2 moles) of IPDI and 400.0 parts by mass of polypropylene glycol having a weight average molecular weight of 400 were placed, and while stirring the mixture, 0.34 parts by mass of tin octylate was added to the mixture, the temperature inside the reaction vessel was increased to 90° C., and the obtained mixture was allowed to react for 1.5 hours. Then, 1400.0 parts by mass of methoxy PEG 2000 and 0.90 parts by mass of tin octylate were added to the reaction mixture, and the obtained mixture was allowed to react further for 1.5 hours. Next, in the reaction vessel, 1300 parts by mass of dipentaerythritol pentaacrylate, 1.77 parts by mass of methoquinone, and 2.13 parts by mass of tin octylate were placed and mixed, and under air bubbling, the temperature inside the reaction vessel was increased to 85° C., and the obtained mixture was allowed to react for 3 hours. Then, the reaction mixture was cooled to obtain the amphiphilic urethane acrylate (e) represented by the general formula (3). The weight average molecular weight of the urethane acrylate (e) was 9,000.

2-3. Preparation Example 1

Synthesis of Urethane Acrylate for Fixing

In the same reaction vessel as in Synthesis Example 1, 444.6 parts by mass (2 moles) of IPDI and 900.0 parts by mass of an aromatic polyester diol (weight average molecular weight: 900, 1 mole, YG-108 [trade name] manufactured by Adeka Corp.) were placed, and while stirring the mixture, 0.27 parts by mass of tin octylate was added to the mixture, the temperature inside the reaction vessel was increased to 85° C., and the obtained mixture was allowed to react for 2 hours. Then, 232.3 parts by mass (2 moles) of 2-hydroxyethyl acrylate, 0.79 parts by mass of methoquinone, and 0.63 parts by mass of tin octylate were placed in the reaction vessel and mixed, and under air bubbling, the temperature inside the reaction vessel was increased to 85° C. and the obtained mixture was allowed to react for 2 hours. Then, the reaction mixture was cooled to obtain the urethane acrylate for fixing. The weight average molecular weight of the urethane acrylate for fixing was 5,000.

Preparation of Photocurable Aqueous Emulsion

1. Synthesis Example 3

Preparation of Photocurable Aqueous Emulsion (q-2)

In the same reaction vessel as in Synthesis Example 1, 27.5 parts by mass of the urethane acrylate (q) obtained above, 9.2 parts by mass of a polypentaerythritol polyacrylate, and 3.3 parts by mass of a photoradical polymerization initiator (TPO) were placed, and while stirring the mixture, the temperature inside the vessel was increased to 80° C. and maintained at the temperature for 2 hours. Next, the temperature inside the vessel was cooled to 50° C., and then, while stirring the mixture, 60 parts by mass of deionized water was added to the mixture, and the mixture was maintained at 40° C. for 1 hour to obtain a photocurable aqueous emulsion (q-2) containing 40% of a nonvolatile content (the amphiphilic urethane acrylate (q), the polypentaerythritol polyacrylate, and the photoradical polymerization initiator (TPO)). Further, the composition is shown in Table 1 below, and in the Tables below, the photocurable aqueous emulsion (q-2) is denoted as "EM q-2 dispersant" or "EM q-2".

2. Synthesis Example 4

Preparation of Photocurable Aqueous Emulsion (e-1)

In the same reaction vessel as in Synthesis Example 1, 23.3 parts by mass of the amphiphilic urethane acrylate (e) obtained above, 8.3 parts by mass of a polypentaerythritol polyacrylate, 1.7 parts by mass of a urethane acrylate for fixing, 5.0 parts by mass of a photoradical polymerization initiator (TPO), 1.7 parts by mass of a photoradical polymerization initiator (DETX), and 0.07 parts by mass of a fluorescent brightening agent (KCB) were placed, and while stirring the mixture, the temperature inside the vessel was increased to 80° C. and maintained at the temperature for 2 hours. Next, the temperature inside the vessel was cooled to 50° C., and then, while stirring the mixture, 60 parts by mass of deionized water was added to the mixture, and the mixture was maintained at 50° C. for 1 hour to obtain a photocurable aqueous emulsion (e-1) containing 40% of a nonvolatile content (the amphiphilic urethane acrylate (e), the polypentaerythritol polyacrylate, the urethane acrylate for fixing, the photoradical polymerization initiators (TPO, DETX), and the fluorescent brightening agent (KCB)). Further, the composition is shown in Table 1 below, and in the Tables below, the photocurable aqueous emulsion (e-1) is denoted as "EM e-1 dispersant" or "EM e-1".

3. Synthesis Example 5

Preparation of Photocurable Aqueous Emulsion (e-5)

In the same reaction vessel as in Synthesis Example 1, 21.6 parts by mass of the amphiphilic urethane acrylate (e) obtained above, 7.7 parts by mass of a polypentaerythritol polyacrylate, 1.5 parts by mass of a urethane acrylate for fixing, 5.0 parts by mass of a photoradical polymerization initiator (TPO), and 1.7 parts by mass of a photoradical polymerization initiator (DETX) were placed, and while stirring the mixture, the temperature inside the vessel was increased to 80° C. and maintained at the temperature for 2 hours. Next, the temperature inside the vessel was cooled to 50° C., and then, while stirring the mixture, 2.5 parts by mass of a cross-linking agent (PEMP) was added to the mixture, and the mixture was continuously stirred as it was for 15 minutes. Then, 60 parts by mass of deionized water was added to the mixture, the mixture was maintained at 50° C. for 1 hour, then the temperature inside the vessel was increased to 80° C., and the mixture was maintained at 80° C. for 6 hours to obtain the photocurable aqueous emulsion (e-5) containing 40% of a nonvolatile content (the amphiphilic urethane acrylate (e), the polypentaerythritol polyacrylate, the urethane acrylate for fixing, the photoradical polymerization initiators (TPO, DETX), and the cross-linking agent (PEMP)). The emulsion was subjected to a GPC measurement to identify a cross-linked urethane acrylate having a weight average molecular weight of 18,000. Further, the composition is shown in Table 1 below, and in the Tables below, the photocurable aqueous emulsion (e-5) is denoted as "EM e-5 dispersant" or "EM e-5".

TABLE 1

| Kinds of materials | Abbreviations | EM q-2 dispersant | EM e-1 dispersant | EM e-5 dispersant |
|---|---|---|---|---|
| Amphiphilic urethane acrylate | (q) | 27.5 | — | — |
|  | (e) | — | 23.3 | 21.6 |
| Cross-linked thiol | PEMP | — | — | 2.5 |
| Radical polymerizable acrylate | Viscoat 802 | 9.2 | 8.3 | 7.7 |
| Urethane acrylate for fixing |  | — | 1.7 | 1.5 |
| Photopolymerization initiator | TPO | 3.3 | 5 | 5 |
|  | DETX | — | 1.7 | 1.7 |
| Fluorescent brightening agent | KCB | — | 0.07 | — |
| Water | ion exchanged water | 60 | 60 | 60 |
| Total amount (% by mass) |  | 100.00 | 100.07 | 100.00 |

Preparation of Photocurable Ink Composition

The components described in Tables 2 and 3 below were added at the compositions (unit: % by mass) described in Tables 2 and 3 below and stirred by a high-speed water-cooling stirred to prepare a photocurable ink composition.

In addition, in Tables 2 and 3, the numerical value in the column of "*" denotes the content of the polymerizable compound based on the total mass of the ink. Further, the numerical value in the column of "**" in the Tables denotes, in the case of being included in the photocurable aqueous emulsion, the content of the included substances, but in the case of being not included in the photocurable aqueous emulsion, the content of the ink, based on the total mass of the ink.

TABLE 2

| Kinds of materials | Abbreviations | Ink 1 | Ink 2 | Ink 3 | Ink 4 | Ink 5 | Ink 6 | Ink 7 |
|---|---|---|---|---|---|---|---|---|
| Pigment | Cyan pigment | 2.00 | — | — | — | — | — | 2.00 |
| | Magenta pigment | — | 2.00 | — | — | — | — | — |
| | Yellow pigment | — | — | 2.00 | — | — | — | — |
| | Black pigment | — | — | — | 2.00 | — | — | — |
| Polymerizable compound | Polyethylene glycol diacrylate | 15.00 | 15.00 | 15.00 | 15.00 | 9.00 | 18.00 | — |
| | Laromer8949 | — | — | — | — | — | — | 15.00 |
| | EM q-2 * | — | — | — | — | — | — | — |
| | EM e-1 * | — | — | — | — | — | — | — |
| | EM e-5 * | — | — | — | — | — | — | — |
| Photopolymerization initiator | TPO ** | 1.00 | 1.00 | 1.00 | 1.00 | 1.00 | 1.00 | 1.00 |
| | DETX ** | 0.10 | 0.10 | 0.10 | 0.10 | — | — | 0.10 |
| Fluorescent brightening agent | KCB ** | — | — | — | — | — | — | — |
| Water-soluble organic solvent | PG | 5.00 | 5.00 | 5.00 | 5.00 | 5.00 | 5.00 | 5.00 |
| | 1,2-HD | 5.00 | 5.00 | 5.00 | 5.00 | 5.00 | 5.00 | 5.00 |
| | 2-P | 1.00 | 1.00 | 1.00 | 1.00 | 1.00 | 1.00 | 1.00 |
| Surfactant | BYK349 | 0.50 | 0.50 | 0.50 | 0.50 | 0.50 | 0.50 | 0.50 |
| | BYK333 | 0.50 | 0.50 | 0.50 | 0.50 | 0.50 | 0.50 | 0.50 |
| pH adjusting agent | TPA | 1.00 | 1.00 | 1.00 | 1.00 | — | — | 1.00 |
| Pure water | Ion exchanged water | Balance | Balance | Balance | Balance | Balance | Balance | Balance |
| Total amount | | 100.00 | 100.00 | 100.00 | 100.00 | 100.00 | 100.00 | 100.00 |

TABLE 3

| Kinds of materials | Abbreviations | Ink 8 | Ink 9 | Ink 10 | Ink 11 | Ink 12 | Ink 13 |
|---|---|---|---|---|---|---|---|
| Pigment | Cyan pigment | 2.00 | 2.00 | 2.00 | — | 2.00 | 2.00 |
| | Magenta pigment | — | — | — | — | — | — |
| | Yellow pigment | — | — | — | — | — | — |
| | Black pigment | — | — | — | — | — | — |
| Polymerizable compound | Polyethylene glycol diacrylate | — | — | — | 15.00 | 2.00 | — |
| | Laromer8949 | — | — | — | — | — | — |
| | EM q-2 * | 15.00 | — | — | — | — | — |
| | EM e-1 * | — | 15.00 | — | — | — | 20.00 |
| | EM e-5 * | — | — | 15.00 | — | — | — |
| Photopolymerization initiator | TPO ** | 1.35 | 2.25 | 2.25 | — | 1.00 | 3.00 |
| | DETX ** | — | 0.77 | 0.77 | — | 0.10 | 1.03 |
| Fluorescent brightening agent | KCB ** | — | 0.03 | — | — | — | 0.04 |
| Water-soluble organic solvent | PG | 5.00 | 5.00 | 5.00 | 5.00 | 5.00 | 5.00 |
| | 1,2-HD | 5.00 | 5.00 | 5.00 | 5.00 | 5.00 | 5.00 |
| | 2-P | 1.00 | 1.00 | 1.00 | 1.00 | 1.00 | 1.00 |
| Surfactant | BYK349 | 0.50 | 0.50 | 0.50 | 0.50 | 0.50 | 0.50 |
| | BYK333 | 0.50 | 0.50 | 0.50 | 0.50 | 0.50 | 0.50 |
| pH adjusting agent | TPA | 1.00 | 1.00 | 1.00 | — | 1.00 | 1.00 |
| Pure water | Ion exchanged water | Balance | Balance | Balance | Balance | Balance | Balance |
| Total amount | | 100.00 | 100.00 | 100.10 | 100.00 | 100.00 | 100.00 |

Examples 1 to 20 and Comparative Examples 1 to 13

The ink jet recording was carried out using a more preferred method in the above-described first embodiment. A serial printer provided with the platen heater as described above was used and MACtac JT-5829 R (PVC film) was used. Further, the printing conditions for the first step were such that the recording resolution was 1440 dpi×1440 dpi and the discharge weight (IW) was 7 ng. The heating conditions with the platen heater in the second step were such that the heating temperatures were as described in Tables 4 and 5, and the duration was 30 seconds. The ultraviolet ray irradiation conditions in the third step were such that the irradiation peak intensity was 1000 mW/cm$^2$. Further, the heating was further carried out after the third step, and the heating condition was 50° C. and 10 minutes. As described above, a recorded product, in which a cured solid image (cured film) was formed on the recorded surface, was prepared.

Evaluation Items

For the recorded products obtained in the respective Examples and Comparative Examples, curability, fillability, adhesiveness, and discharge stability were evaluated by the following methods.

1. Curability

Using a Gakushin-Type Color Fastness Rubbing Tester AB-301 (manufactured by Tester Sangyo, Ltd.), the recorded product was combined with a friction element equipped with a white cotton friction cloth (Canequim No. 3) under the conditions of a load of 500 g by rubbing 100 times, and the surface state of the image was visually observed. Based on the criteria with scratches of the image surface at less than 10 points, the integrated irradiation energy (mJ/cm$^2$) meeting the above criteria was measured.

Further, the irradiation energy [mJ/cm$^2$] was determined by measuring the irradiation intensity [mW/cm$^2$] in the irradiation surface irradiated from a light source, and multiplying this by the irradiation duration [s]. The measurement of the irradiation intensity was carried out using an ultraviolet ray illuminometer UM-10 and a light-receiving unit UM-400 (both manufactured by Konica Minolta Sensing, Inc.). The evaluation results are shown in Tables 4 and 5 below.

2. Fillability

The embedment state of the solid image in the recorded product obtained above was visually observed. The evaluation criteria are as follows. The evaluation results are shown in Tables 4 and 5 below. Further, better evaluation results of the fillability of the solid image can denote higher image quality.

A: When visually observed from a height of 30 cm from the recording medium, the base was not seen and the entire surface was filled.

B: When visually observed from a height of 30 cm from the recording medium, less than 10% of the base with respect to the entire area of the solid surface was found.

C: When visually observed from a height of 30 cm from the recording medium, 10% or more of the base with respect to the entire area of the solid surface was found.

3. Adhesiveness

The evaluation of the adhesiveness was performed in accordance with a cross-cut test (JIS K5600-5-6).

The evaluation criteria are as follows. The evaluation results are shown in Tables 4 and 5 below.

A: A cut edge is completely smooth, and there is no peeling in any cell of the lattice.

B: Small peeling is recognized at a cut intersection of a coated film.

C: Peeling occurs along the cut edge and/or at the cut intersection of the coated film.

D: Peeling occurs partially or entirely along the cut edge of the coated film, or peeling occurs partially or entirely at various portions of the cell.

4. Discharge Stability

From a head having 180 nozzles with a discharge nozzle diameter of 20 μm and a driving frequency of 18 kHz, as well as an ink discharge amount of 7 ng per time, each of the ink was continuously discharged onto a recording medium having a size of A4 for 60 minutes to perform solid printing. At this time, the number of the nozzles with occurrence of nozzle depletion was determined.

The evaluation criteria are as follows. The evaluation results are shown in Tables 4 and 5 below.

A: There was no nozzle depletion.

B: The number of nozzle depletion was from 1 to 5.

C: The number of nozzle depletion was from 6 to 20.

D: The number of nozzle depletion was 21 or more.

TABLE 4

|  |  | Second step (third step) | | Evaluation results | | | |
| --- | --- | --- | --- | --- | --- | --- | --- |
|  | Ink No. | Heating temperature (° C.) | Content of the polymerizable compound | Curability (integrated irradiation energy) | Solid embedment | Adhesiveness | discharge stability |
| Example 1 | Ink 1 | 40 | 20 | 500 | A | B | B |
| Example 2 | Ink 1 | 45 | 30 | 350 | A | B | B |
| Example 3 | Ink 1 | 50 | 50 | 300 | A | B | B |
| Example 4 | Ink 1 | 55 | 75 | 250 | A | B | B |
| Example 5 | Ink 2 | 55 | 75 | 250 | A | B | B |
| Example 6 | Ink 3 | 55 | 75 | 300 | A | B | B |
| Example 7 | Ink 4 | 55 | 75 | 300 | A | B | B |
| Example 8 | Ink 5 | 60 | 90 | 200 | B | B | A |
| Example 9 | Ink 7 | 55 | 75 | 250 | A | A | B |
| Example 10 | Ink 7 | 60 | 90 | 200 | A | A | B |
| Example 11 | Ink 8 | 55 | 75 | 200 | A | A | B |
| Example 12 | Ink 8 | 60 | 90 | 150 | A | A | B |
| Example 13 | Ink 9 | 40 | 20 | 350 | A | B | A |
| Example 14 | Ink 9 | 45 | 30 | 300 | A | A | A |
| Example 15 | Ink 9 | 55 | 75 | 100 | A | A | A |
| Example 16 | Ink 9 | 60 | 90 | 50 | A | A | A |
| Example 17 | Ink 10 | 40 | 20 | 400 | A | B | A |
| Example 18 | Ink 10 | 45 | 30 | 350 | A | A | A |
| Example 19 | Ink 10 | 55 | 75 | 150 | A | A | A |
| Example 20 | Ink 10 | 60 | 90 | 100 | A | A | A |

TABLE 5

|  |  | Second step (before the third step) | | Evaluation results | | | |
| --- | --- | --- | --- | --- | --- | --- | --- |
|  | Ink No. | Heating temperature (° C.) | Content of the polymerizable compound | Curability (integrated irradiation energy) | Solid embedment | Adhesiveness | Discharge stability |
| Comparative Example 1 | ink 1 | No heating | 15 | 1000 | A | D | B |
| Comparative Example 2 | ink 1 | 35 | 18 | 800 | A | C | B |
| Comparative Example 3 | ink 6 | 60 | 95 | 200 | C | B | C |
| Comparative Example 4 | ink 7 | 62 | 95 | 150 | C | A | B |
| Comparative Example 5 | ink 8 | 62 | 95 | 100 | B | C | B |

TABLE 5-continued

| | Ink No. | Second step (before the third step) | | Evaluation results | | | |
|---|---|---|---|---|---|---|---|
| | | Heating temperature (°C.) | Content of the polymerizable compound | Curability (integrated irradiation energy) | Solid embedment | Adhesiveness | Discharge stability |
| Comparative Example 6 | ink 9 | 30 | 17 | 600 | A | B | A |
| Comparative Example 7 | ink 9 | 62 | 94 | 50 | B | C | A |
| Comparative Example 8 | ink 10 | 35 | 17 | 650 | A | B | A |
| Comparative Example 9 | ink 10 | 62 | 94 | 100 | B | C | A |
| Comparative Example 10 | ink 11 | 55 | 75 | Not cured | — | — | B |
| Comparative Example 11 | ink 12 | No heating | 2 | Not cured | — | — | A |
| Comparative Example 12 | ink 13 | No heating | 20 | 350 | A | B | C |
| Comparative Example 13 | ink 1 | 65 | 95 | 200 | C | B | B |

From the results above, it could be seen that an ink jet recording method (the respective Examples) including discharging liquid droplets of a predetermined photocurable ink composition onto a recording medium to land the liquid droplets, thereby forming an image, evaporating the solvent included in the ink composition constituting the image, and irradiating an image after the second step with light, in which when the irradiation is initiated in the third step, the content of the polymerizable compound included in the photocurable ink composition constituting the image after the second step is from 20 to 90% by mass, based on the total mass of the ink composition, is excellent in curability, fillability, adhesiveness, and discharge stability, as compared with the recording method having a different configuration from the above (the respective Comparative Examples).

To discuss in more detail, when viewing the inks 1 to 6, 11, and 12 containing polyethylene glycol diacrylate which is a water-soluble resin, in Comparative Examples where the content of the polymerizable compound included in the photocurable ink composition constituting the image after the second step (hereinafter referred to as the "content ratio") is too high and the heating temperature is set too high, and thus, it is presumed that when the content ratio is increased after the attachment of the ink onto the recording medium, the spreading of the ink and the fillability are poor. It is presumed that a higher content ratio of the water-soluble resin tends to makes it difficult for the ink to spread that the discharge stability does not affect the content ratio. It is presumed that in Comparative Examples 3 and 12, the discharge stability is deteriorated due to the ink composition used. In addition, evaluation was carried out in the same manner as in Comparative Example 12, except that an ink composition, in which the content of the photocurable aqueous emulsion EM e-1 in the ink composition 13 was increased, instead of the ink composition 13 used in Comparative Example 12, to set the content of the polymerizable compound to 30% by mass, was used. As a result, it can be seen that the discharge stability is D and the curability is improved, as compared with Comparative Example 12.

Moreover, regarding the inks 8, 9, and 10, it is presumed that when the content ratio is too high, the fillability does not become poor, but the adhesiveness becomes poor.

Furthermore, the ink 7 is an ink including the polymerizable compound in the dispersion state, but it is presumed that the results of the inks 1 to 6, 11, and 12 are similar to each other. Laromer 8949 included in the ink 7 is a commercially available urethane, and is presumed to be not a urethane (meth)acrylate having a hydrophobic structure represented by "A¹-O—CONH—B¹—NH—COO—" and a hydrophilic structure represented by "-D¹" in the molecule thereof.

The entire disclosure of Japanese Patent Application No. 2012-074183, filed Mar. 28, 2012 is expressly incorporated by reference herein.

What is claimed is:

1. An ink jet recording method comprising:
discharging liquid droplets of a photocurable ink composition including a solvent, a polymerizable compound, and a photopolymerization initiator from a head to a recording medium to land the liquid droplets, thereby forming an image, wherein the content of the polymerizable compound is 50% by mass or less, based on the total mass of the ink composition;
evaporating the solvent included in the photocurable ink composition constituting the image; and
irradiating the image after the evaporation of the solvent with light,
wherein when the irradiation is initiated in the irradiation of the image with light, the content of the polymerizable compound included in the photocurable ink composition constituting the image after the evaporation of the solvent is from 20 to 90% by mass, based on the total mass of the ink composition.

2. The ink jet recording method according to claim 1, wherein the recording medium is non-ink-absorptive or low-ink-absorptive.

3. The ink jet recording method according to claim 1, wherein the polymerizable compound is included in the photocurable ink composition in the dispersion state.

4. The ink jet recording method according to claim 1, wherein the polymerizable compound is a urethane (meth)acrylate.

5. The ink jet recording method according to claim 4, wherein the polymerizable compound is a urethane (meth)acrylate having a hydrophobic structure represented by the following general formula (1), and a hydrophilic structure represented by the following general formula (2) in the molecule thereof:

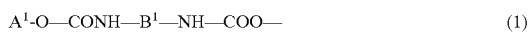

$$A^1\text{-O}\text{—CONH}\text{—}B^1\text{—NH}\text{—COO—} \qquad (1)$$

$$\text{-}D^1 \qquad (2)$$

(wherein $A^1$ represents a residue of a hydroxyl group-containing (meth) acrylate, $B^1$ represents a residue of a diisocyanate, and $D^1$ represents a residue of a polyoxyalkylene glycol monoalkyl ether).

6. The ink jet recording method according to claim 5, wherein the urethane (meth) acrylate has a weight average molecular weight of 1,000 to 10,000 and is at least either of a compound represented by the following general formula (3) and a crosslinked urethane (meth) acrylate having a structural unit including the compound:

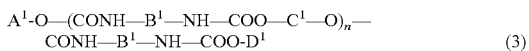  (3)

(wherein n represents an integer of 1 to 30, $A^1$ represents a residue of a hydroxyl group-containing (meth) acrylate, $B^1$ represents a residue of a diisocyanate, $C^1$ represents a residue of a diol of a noncyclic hydrocarbon or a cyclic hydrocarbon, and $D^1$ represents a residue of a polyoxyalkylene glycol monoalkyl ether).

7. The ink jet recording method according to claim 1, wherein the content of the polymerizable compound included in the photocurable ink composition constituting the image after the evaporation of the solvent is from 30 to 90% by mass based on the total mass of the ink composition.

8. The ink jet recording method according to claim 1, wherein main scanning for discharging the photocurable ink composition from the head onto the recording medium and sub-scanning for moving the recording medium and the head in the minor direction relatively crossing the major direction are carried out alternatively to perform recording, and a light source for carrying out the irradiation on the downstream side in the minor direction with respect to the head is provided; and the irradiation is carried out next to the main scanning in which the photocurable ink composition is attached to the recording medium.

9. A photocurable ink jet ink composition used in the ink jet recording method according to claim 1.

10. A photocurable ink jet ink composition used in the ink jet recording method according to claim 2.

11. A photocurable ink jet ink composition used in the ink jet recording method according to claim 3.

12. A photocurable ink jet ink composition used in the ink jet recording method according to claim 4.

13. A photocurable ink jet ink composition used in the ink jet recording method according to claim 5.

14. A photocurable ink jet ink composition used in the ink jet recording method according to claim 6.

15. A photocurable ink jet ink composition used in the ink jet recording method according to claim 7.

16. A photocurable ink jet ink composition used in the ink jet recording method according to claim 8.

17. An ink jet recording device using the ink jet recording method according to claim 1.

18. An ink jet recording device using the ink jet recording method according to claim 2.

19. An ink jet recording device using the ink jet recording method according to claim 3.

20. An ink jet recording device using the ink jet recording method according to claim 4.

21. The ink jet recording method according to claim 1, wherein the solvent comprises water and an organic solvent.

22. The ink jet recording method according to claim 1, wherein the solvent comprises an organic solvent and the content of the organic solvent is from 2 to 40% by mass, based on the total mass of the ink composition.

* * * * *